US009819684B2

United States Patent
Cernoch et al.

(10) Patent No.: US 9,819,684 B2
(45) Date of Patent: Nov. 14, 2017

(54) SYSTEMS AND METHODS FOR SCALABLE-FACTOR AUTHENTICATION

(71) Applicant: Live Nation Entertainment, Inc., Beverly Hills, CA (US)

(72) Inventors: Dan Cernoch, Los Angeles, CA (US); Ajay Pondicherry, Los Angeles, CA (US); David Refsland, Los Angeles, CA (US); Kenneth Ives-Halperin, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 15/367,862

(22) Filed: Dec. 2, 2016

(65) Prior Publication Data

US 2017/0163647 A1   Jun. 8, 2017

Related U.S. Application Data

(60) Provisional application No. 62/263,290, filed on Dec. 4, 2015.

(51) Int. Cl.
*H04L 29/06* (2006.01)
*G06F 21/44* (2013.01)
*G06F 21/31* (2013.01)

(52) U.S. Cl.
CPC .............. *H04L 63/10* (2013.01); *G06F 21/44* (2013.01); *H04L 63/08* (2013.01); *G06F 21/31* (2013.01)

(58) Field of Classification Search
None
See application file for complete search history.

(56) References Cited

U.S. PATENT DOCUMENTS

| 8,881,251 | B1 * | 11/2014 | Hilger | H04L 63/083 |
| | | | | 713/183 |
| 9,195,834 | B1 * | 11/2015 | Jakobsson | G06F 21/31 |
| 9,264,419 | B1 * | 2/2016 | Johansson | H04L 63/08 |
| 9,485,237 | B1 * | 11/2016 | Johansson | H04L 63/08 |

(Continued)

FOREIGN PATENT DOCUMENTS

| GB | WO 2015140531 A1 * | 9/2015 | G06F 21/316 |
| WO | 2017/096214 A1 | 6/2017 | |
| WO | WO2017096214 A1 * | 6/2017 | |

OTHER PUBLICATIONS

International Search Report and Written Opinion of PCT/US2016/064705 dated Feb. 6, 2017, all pages.
Notice of Publication of PCT/US2016/064705 dated Jun. 8, 2017.

*Primary Examiner* — Malcolm Cribbs
(74) *Attorney, Agent, or Firm* — Kilpatrick Townsend & Stockton LLP

(57) ABSTRACT

Authentication systems and methods can selectively authenticate a request to access a resource data store storing access rights associated with a user device. The systems and methods can scalably execute challenges workflows as part of the authentication process. For example, a request to access one or more access rights stored in the data store can be received from the user device. The user device can be authenticated using challenge workflows selected based on a device identifier of the user device. The selected challenge workflows can be executed to determine whether or not to grant access to the access rights stored in the resource data store.

17 Claims, 18 Drawing Sheets

(56) References Cited

U.S. PATENT DOCUMENTS

| | | | |
|---|---|---|---|
| 2004/0039909 A1* | 2/2004 | Cheng | G06F 21/32 713/169 |
| 2004/0068653 A1* | 4/2004 | Fascenda | H04L 9/0844 713/168 |
| 2006/0015725 A1* | 1/2006 | Voice | H04L 63/0245 713/168 |
| 2006/0156385 A1* | 7/2006 | Chiviendacz | G06F 21/36 726/2 |
| 2007/0186106 A1 | 8/2007 | Ting et al. | |
| 2008/0168534 A1* | 7/2008 | Takamizawa | G06F 21/32 726/2 |
| 2009/0083833 A1* | 3/2009 | Ziola | G06F 21/31 726/2 |
| 2009/0165125 A1* | 6/2009 | Brown | G06F 21/31 726/21 |
| 2009/0187962 A1 | 7/2009 | Brenneman | |
| 2011/0004921 A1* | 1/2011 | Homer | G06F 21/31 726/3 |
| 2011/0030040 A1* | 2/2011 | Ronchi | G06F 21/126 726/5 |
| 2012/0023554 A1* | 1/2012 | Murgia | H04L 63/102 726/4 |
| 2013/0133055 A1* | 5/2013 | Ali | H04L 63/0861 726/7 |
| 2013/0167215 A1* | 6/2013 | Yang | G06F 21/35 726/7 |
| 2013/0232542 A1* | 9/2013 | Cheng | G06F 21/6218 726/1 |
| 2013/0347129 A1* | 12/2013 | Samuelsson | H04L 9/321 726/28 |
| 2014/0013444 A1* | 1/2014 | Gilchrist | G06F 21/10 726/28 |
| 2014/0215559 A1* | 7/2014 | Ali | H04W 12/06 726/3 |
| 2015/0058928 A1* | 2/2015 | Guo | H04L 63/08 726/3 |
| 2016/0055322 A1* | 2/2016 | Thomas | G06F 21/10 726/7 |
| 2016/0065568 A1* | 3/2016 | Dave | H04L 63/0853 726/4 |
| 2016/0087957 A1* | 3/2016 | Shah | H04L 63/205 726/1 |
| 2016/0350548 A1* | 12/2016 | Lewis | G06F 21/6218 |
| 2016/0359827 A1* | 12/2016 | Krishnaiah | H04L 63/08 |
| 2016/0381080 A1* | 12/2016 | Reddem | H04L 63/0884 726/1 |

* cited by examiner

SYSTEMS AND METHODS FOR SCALABLE-FACTOR AUTHENTICATION

CROSS-REFERENCE TO RELATED APPLICATIONS

This application claims the priority benefit to U.S. Provisional Application No. 62/263,290, filed Dec. 4, 2015, and entitled "SYSTEMS AND METHODS FOR SCALABLE-FACTOR AUTHENTICATION," the disclosure of which is hereby incorporated by reference in its entirety for all purposes.

TECHNICAL FIELD

The present disclosure relates generally to multi-factor authentication. More specifically, the present disclosure relates to systems and methods for scalable authentication of access to resource data using workflows.

BACKGROUND

Accessibility to digital information has become increasingly easy for users. For example, users can access content from anywhere via their mobile devices as long as an Internet connection exists. However, unauthorized access to digital information has also increased. Unauthorized devices can gain access to and interact with a user's secured information. Current authentication techniques are burdensome to authorized users. Further, these authentication tools do not easily differentiate between authorized and unauthorized devices.

SUMMARY

In some embodiments, a computer-implemented method for scalable authentication of access to resource data using challenge workflows is provided. A first communication can be received from a user device. For example, the first communication can correspond to a request for access to one or more access rights assigned to the user device. The one or more access rights can be included in a plurality of access rights stored in a resource data store. Further, a device identifier of the user device can be extracted from the first communication. For example, the device identifier can characterize an attribute of the user device. A set of challenge workflows can be accessed. In some cases, each challenge workflow of the set of challenge workflows can include a process that is performed to authenticate user devices requesting access to the resource data store. A parameter for each challenge workflow of the set of challenge workflows can be generated. The generation of the parameter for each challenge workflow can be based on the device identifier of the user device. For example, the generation of the parameter can include applying a defined rule to the device identifier to generate the parameter. A subset of challenge workflows can be selected from the set of challenge workflows. The selection of the subset can be performed using a comparison of each parameter and a threshold condition. For example, the parameters (and the associated challenge workflows) that meet or exceed the threshold condition can be selected as the subset, whereas, the parameters (and the associated challenge workflows) that do not meet or exceed the threshold condition are not selected as the subset. Each challenge workflow of the subset of challenge workflows can be executed. The execution of a challenge workflow from the subset can include performing an authentication test to be satisfied before access to the one or more access rights is granted. One or more second communications can be received. For example, each of the one or more second communications can be a response to an authentication test associated with execution of a challenge workflow (of the subset). For each challenge workflow of the subset of challenge workflows, it can be determined whether the corresponding second communication satisfies the associated authentication test. A communication link can be established between the user device and the resource data store to grant access to the one or more access rights when the corresponding authentication test for each challenge workflow of the subset of challenge workflows is satisfied.

In some embodiments, a system for scalable authentication of access to resource data using challenge workflows is provided. The system can include one or more data processors, and a non-transitory computer-readable storage medium containing instructions which, when executed on the one or more data processors, cause the one or more data processors to perform one or more actions of one or more methods disclosed herein.

In some embodiments, a computer-program product tangibly embodied in a non-transitory machine-readable storage medium is provided. The computer-program product includes instructions configured to cause one or more data processors to perform actions of one or more methods disclosed herein.

BRIEF DESCRIPTION OF THE DRAWINGS

The specification makes reference to the following appended figures, in which use of like reference numerals in different figures is intended to illustrate like or analogous components.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to devices, systems, and methods for scalably authenticating requests for accessing digital information (e.g., stored access rights) using challenge workflows (e.g., factors, authentication tests, etc.). A request to access a resource data store that stores one or more access rights to a resource can be received from a user device. The user device transmitting the request can selectively be authenticated in a scalable manner using one or more challenge workflows (used interchangeably with "factors"). In addition, the number and type of challenge workflows that are executed as part of the authentication process can be determined based on a type of user device that transmitted the request (e.g., laptop, smartphone, server, etc.), information included in the request (e.g., a type of request, information associated with the stored one or more access rights, an Internet Protocol (IP) address associated with the request, a geographical location of the user device, etc.), or information related to the one or more access rights that the user device requested to access. In some examples, the request to access the resource data store can correspond to a request to reassign the access right to another user, to perform a printing operation to print a physical representation of the access right, and the like.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
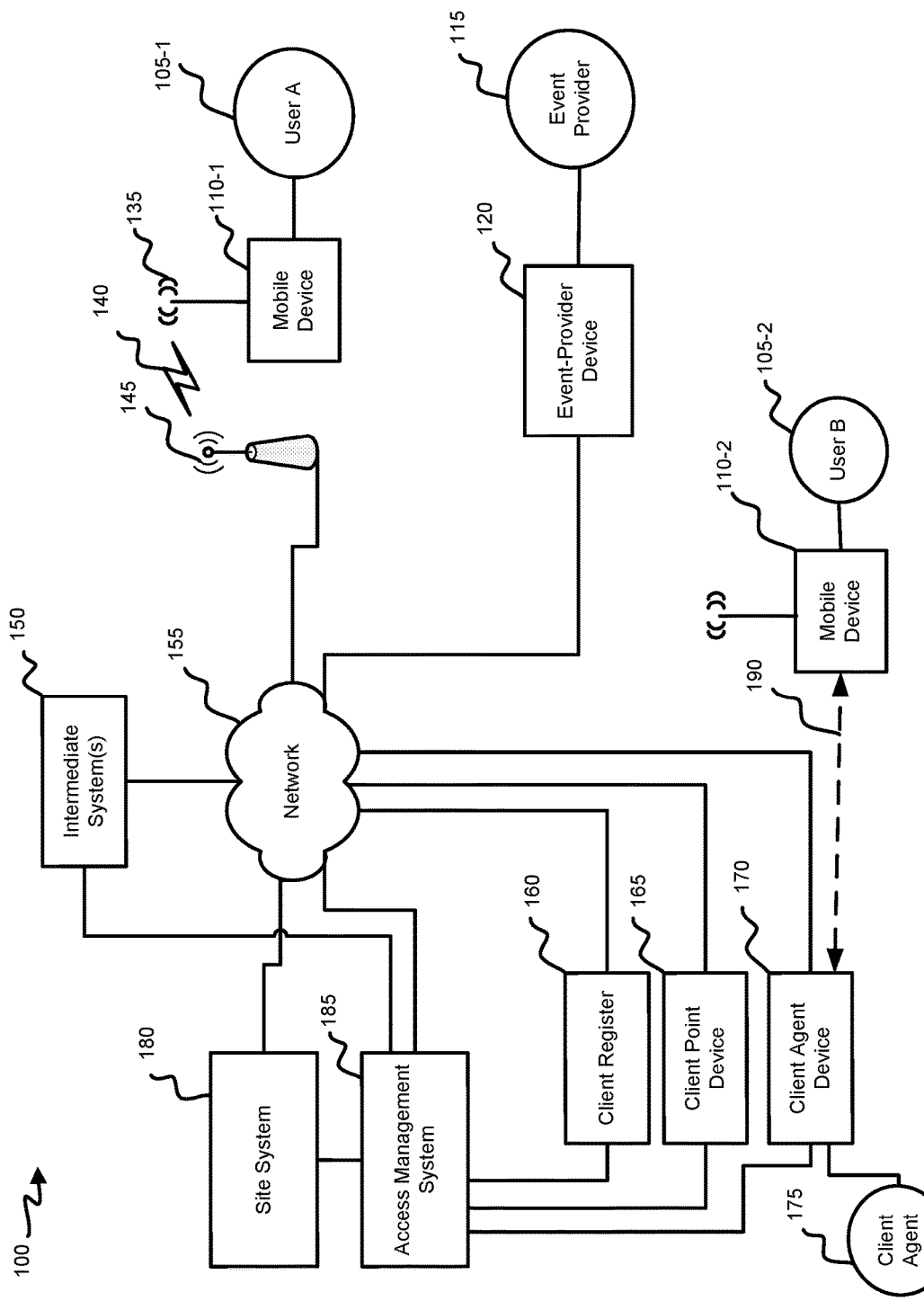
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
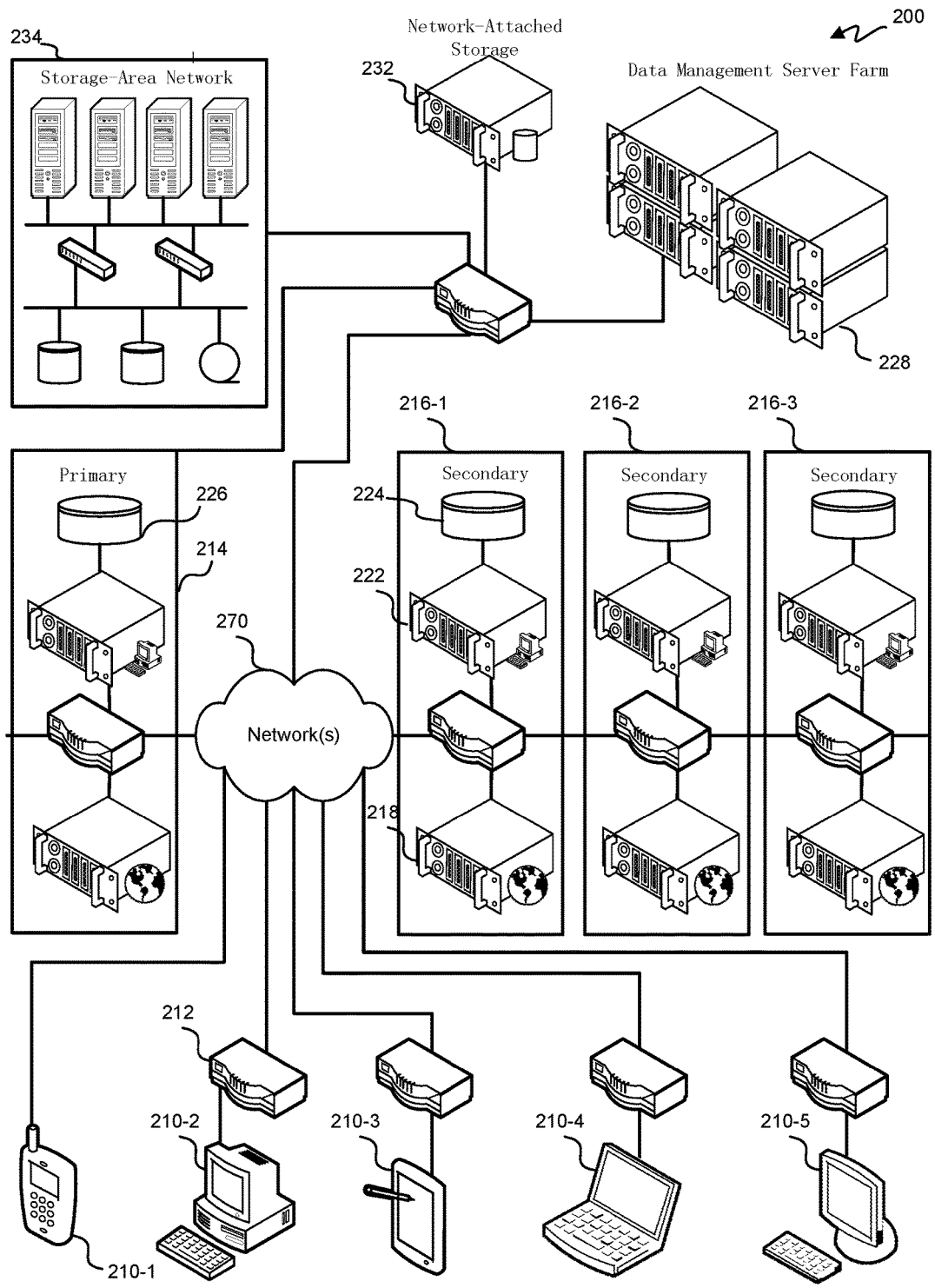
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
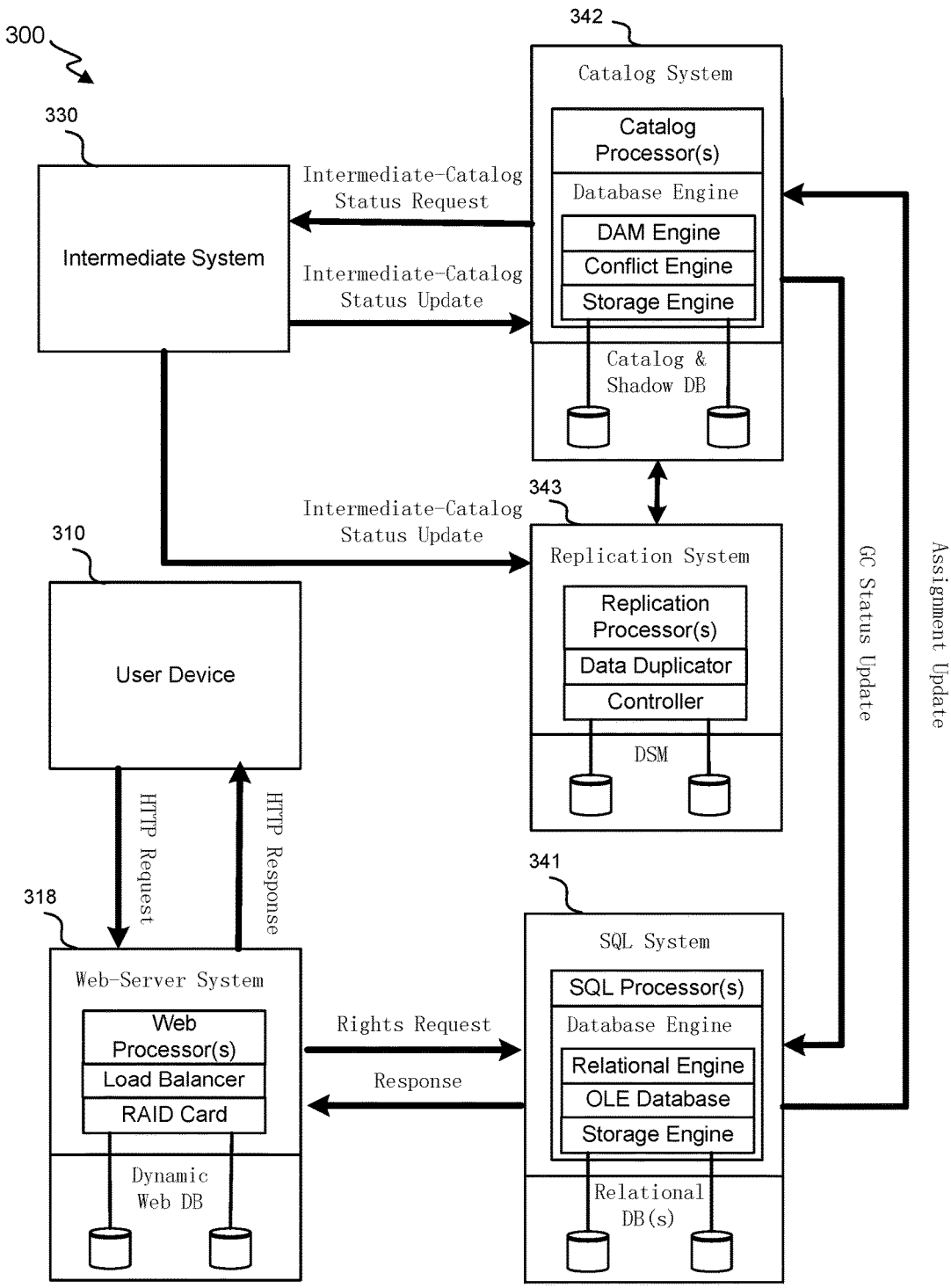
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a value associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
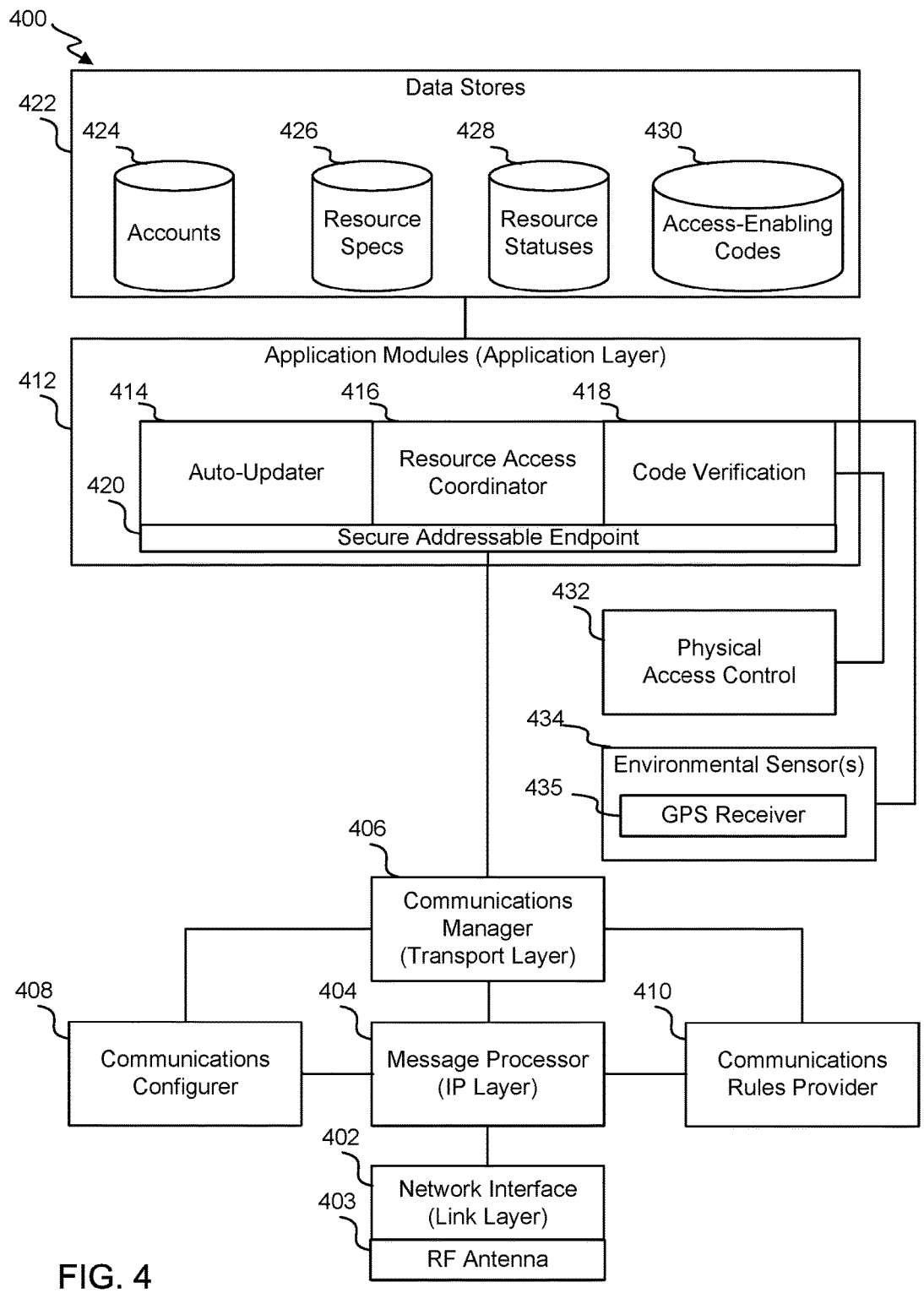
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), assignment data (e.g., reflecting dates, values and/or items of past purchases). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
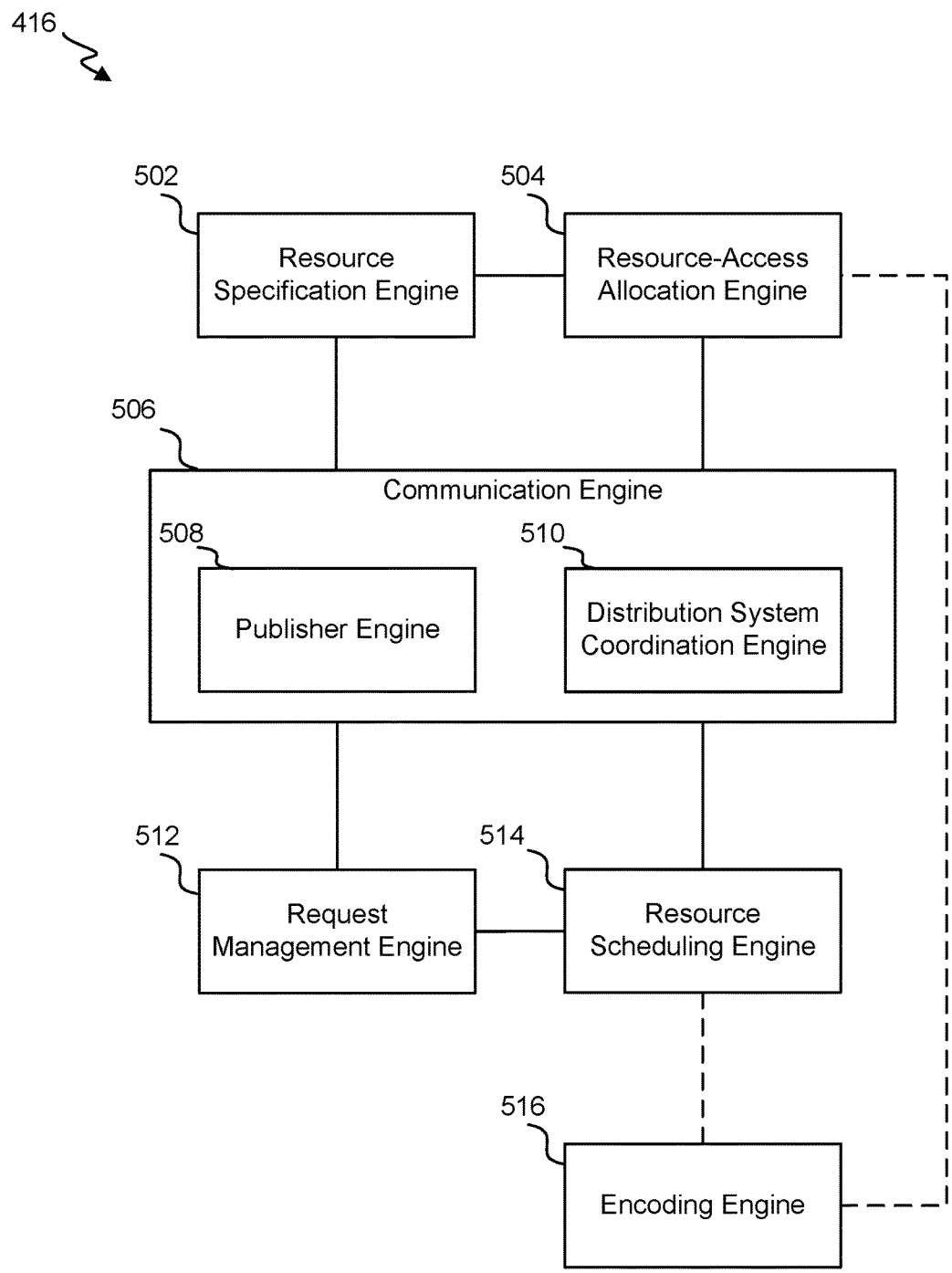
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, native application page or communication to an intermediate system). Request management engine 512 can also or alternatively obtain information associated with the completion of a request (received from a user device) for assignment of one or more access rights. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences associated with the profile from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, assignment history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., before completion of the request) and/or to change a status of the access right(s) to indicate that they have been assigned. Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
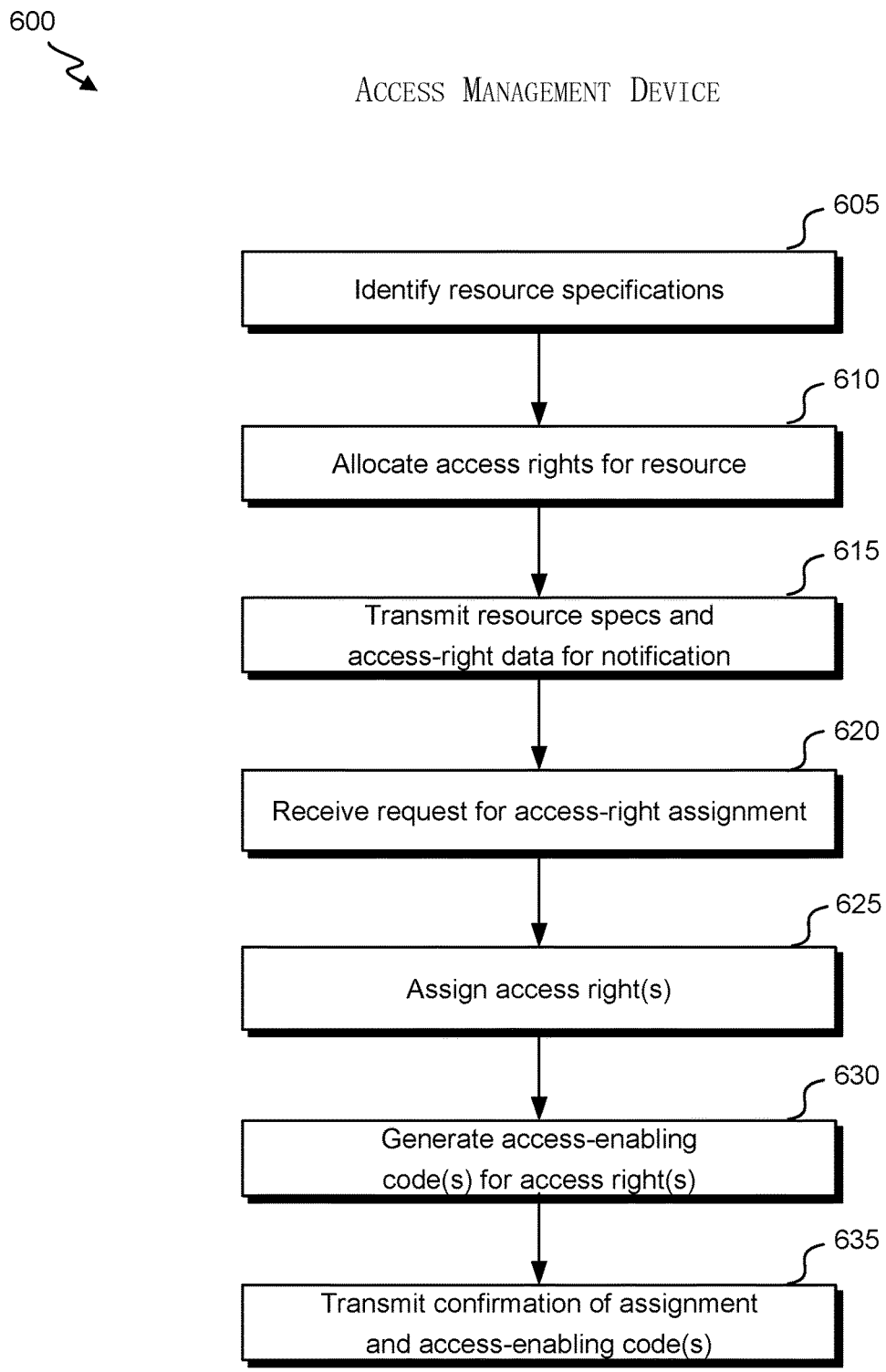
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
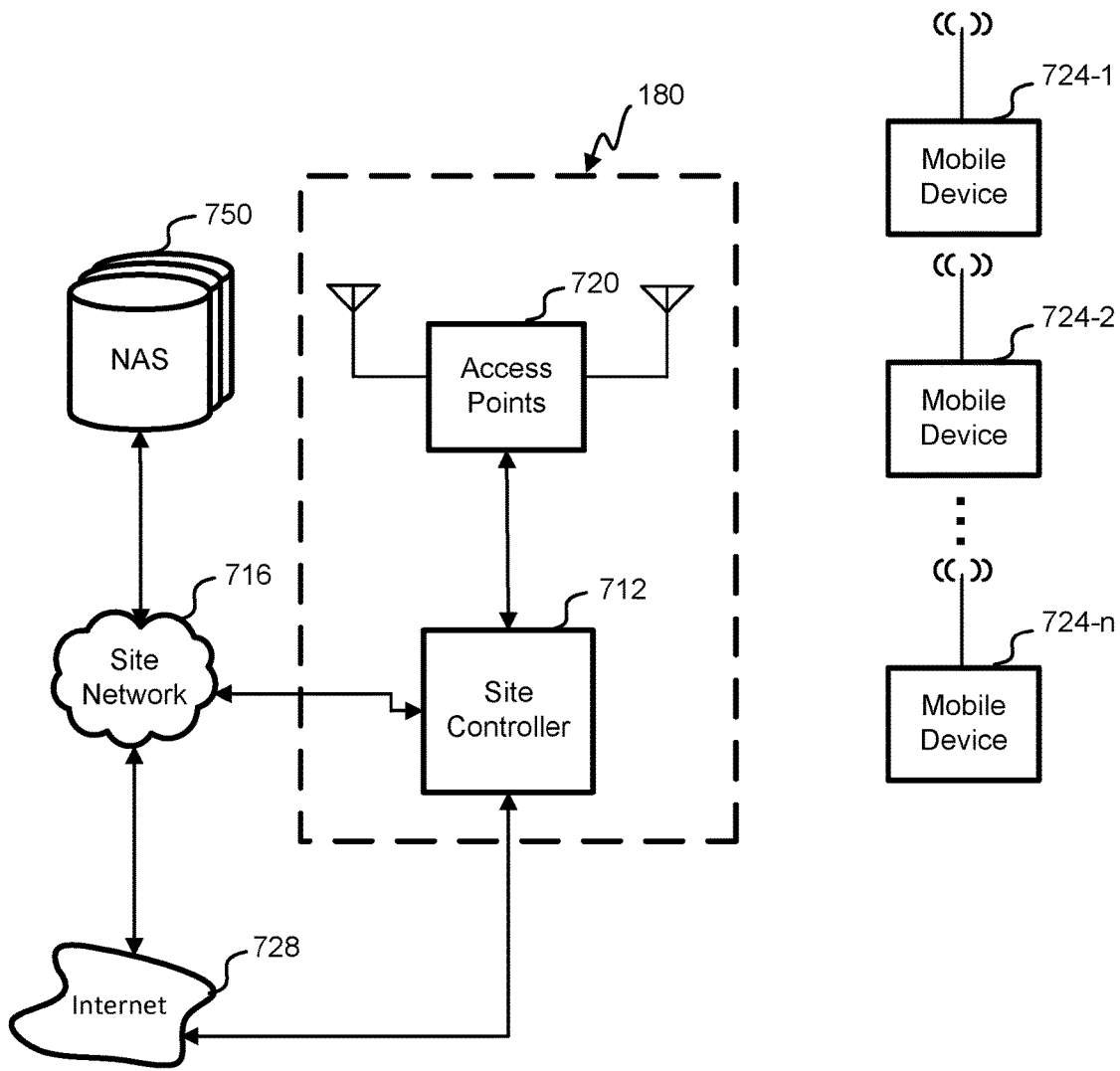
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the network 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
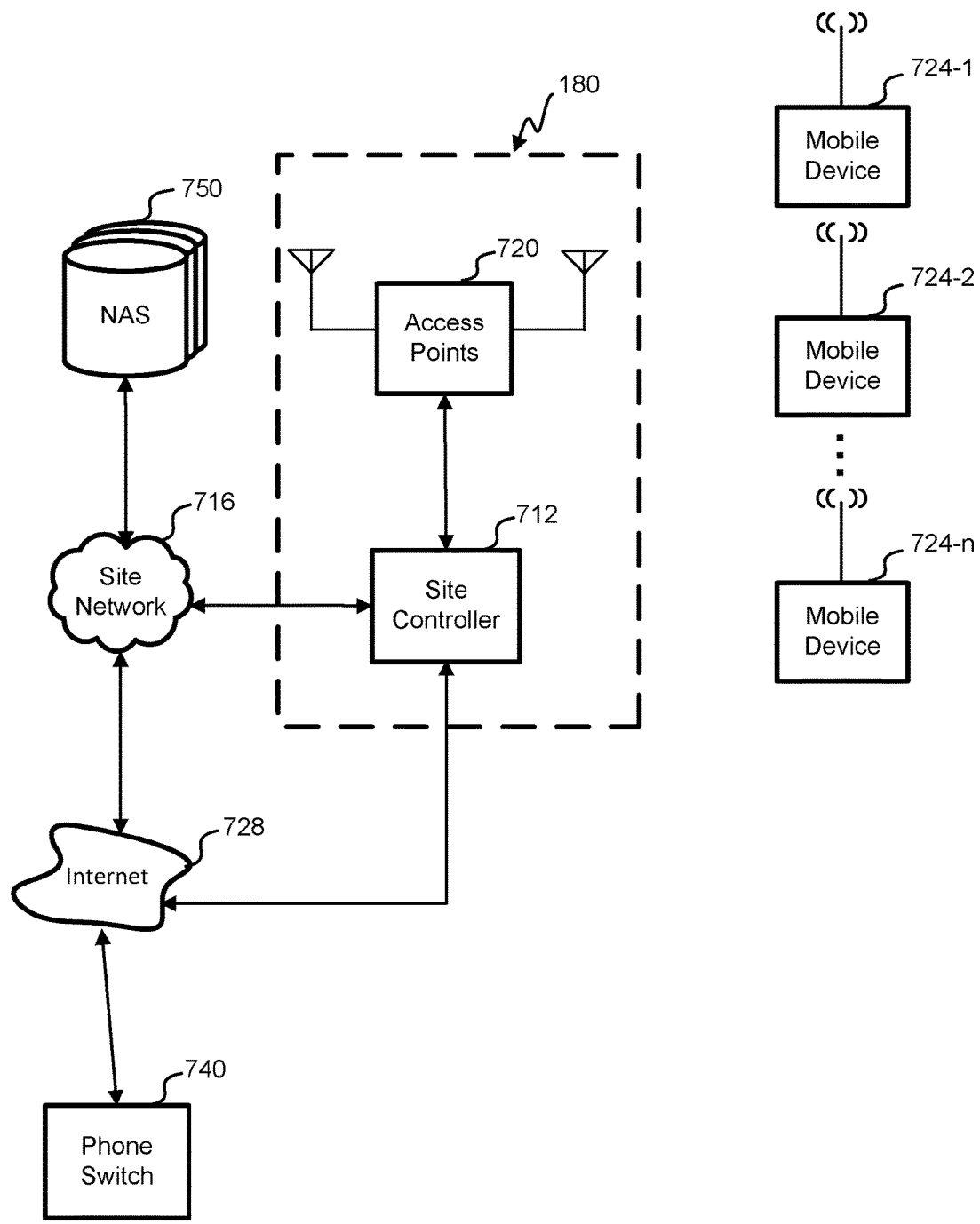

Referring to FIG. 7B, another embodiment of a site system 180 is shown in relation to mobile devices 724-n, Network Attached Storage (NAS) 750, site network 716 and the network 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
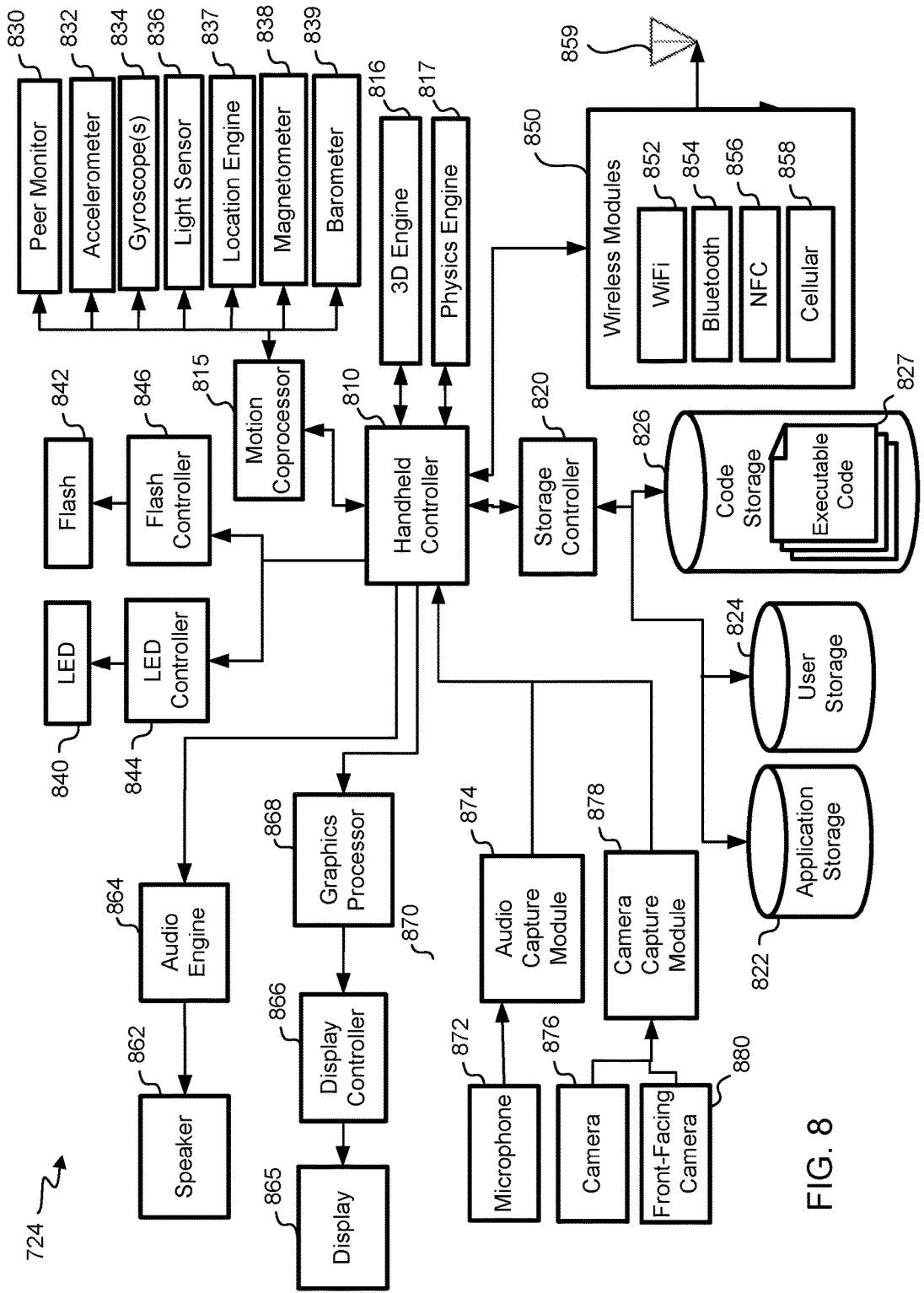
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
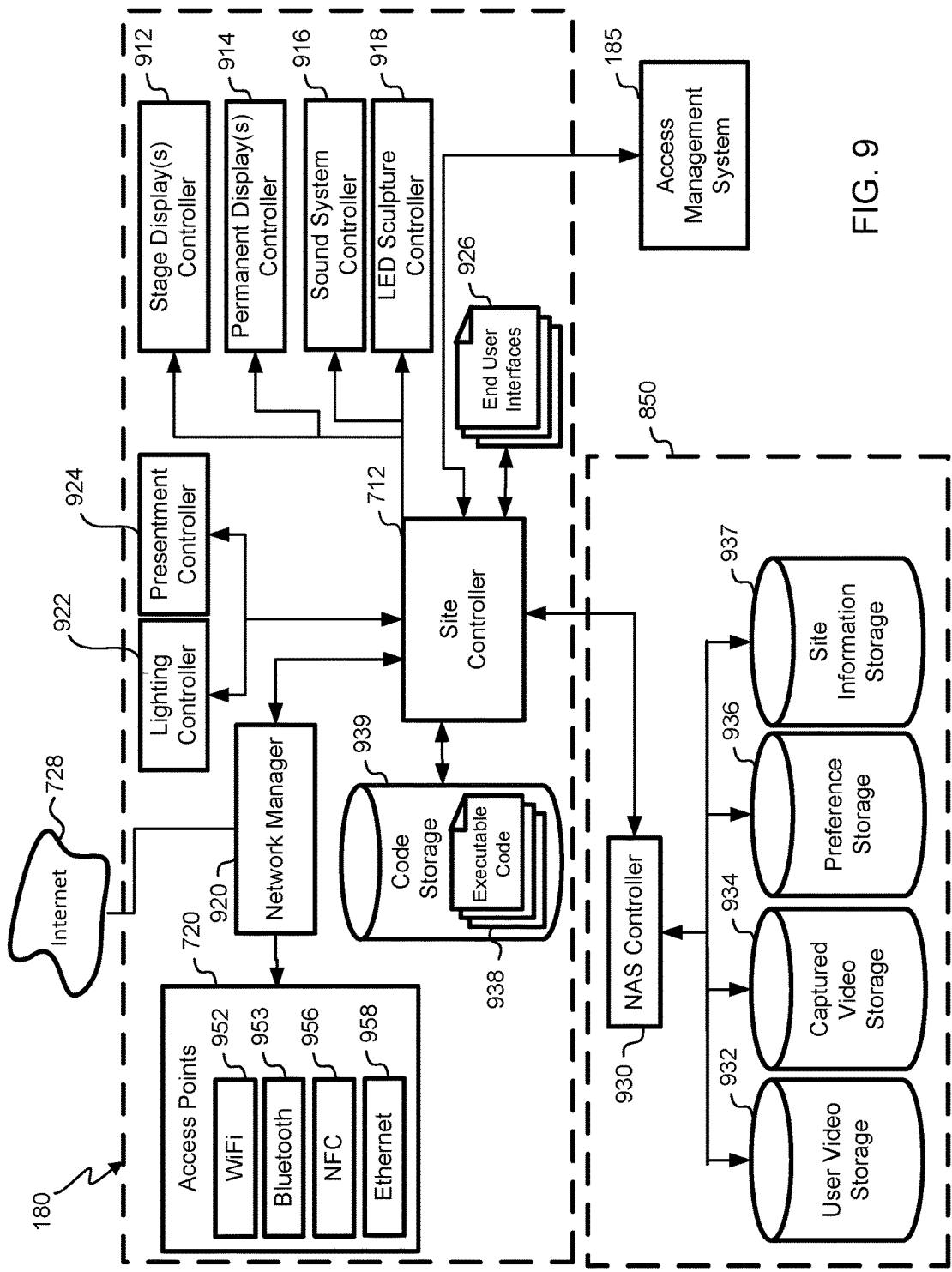
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of venue features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the venue sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10:
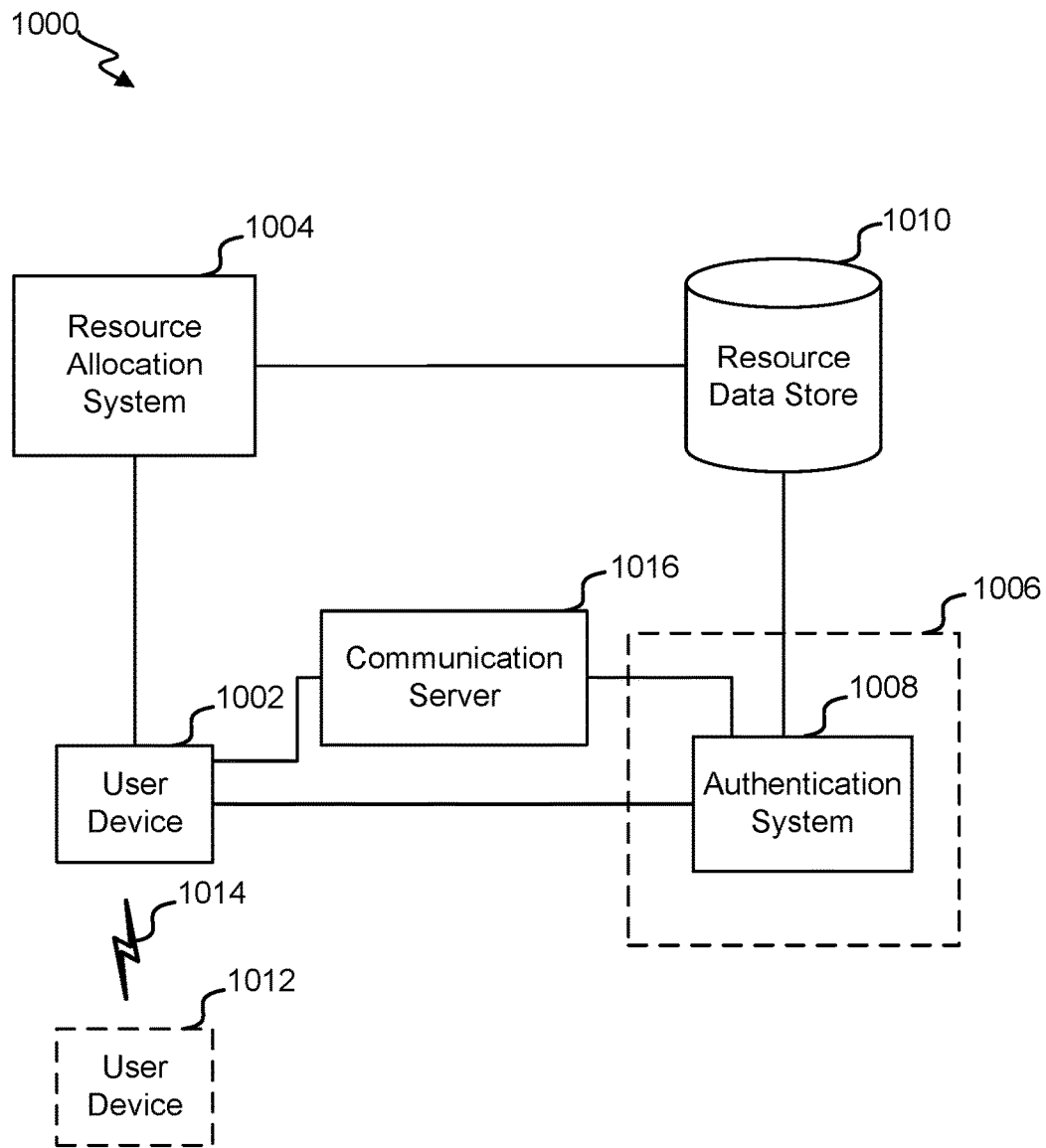
FIG. 10 is a block diagram illustrating another embodiment of a resource access-facilitating interaction system.

FIG. 10 is a block diagram illustrating another embodiment of resource access-facilitating interaction system 1000. Resource access-facilitating interaction system 1000 can include user device 1002, resource allocation system 1004, resource access system 1006, and resource data store 1010. In some cases, resource access-facilitating interaction system 1000 can also include communication server 1016 and user device 1012. Resource access-facilitating interaction system 1000 can facilitate the authentication of requests to access one or more access rights stored in resource data store 1010. Authentication of requests to access resource data store 1010 can authenticate whether the device requesting access to resource data store 1010 is authorized. For example, the authentication of requests to access resource data store 1010 can be dynamic and scalable, in that the type and number of challenge workflows executed as part of the authentication process can change based on one or more aspects, attributes, or characteristics of the device requesting the access.

In some cases, the one or more access rights stored in resource data store 1010 may be assigned to a particular user device. For example, the one or more access rights (e.g., electronic tickets) may grant the particular user device access to a resource (e.g., an event) during a defined time period. Further, access to the one or more access rights stored in resource data store 1010 can enable a user to request reassignment (e.g., transfer, sell, etc.) of the one or more access rights to another user, perform a printing operation associated with the one or more access rights (e.g., print an electronic ticket), or otherwise interact with the one or more access rights.

Resource allocation system 1004 can include one or more servers and one or more networks to facilitate the assignment of access rights. For example, resource allocation system 1004 can facilitate assignment of access rights to user devices. Resource allocation system 1004 can be configured to manage a dynamic set of access rights to one or more resources. More specifically, resource allocation system 1004 can track which access rights or resources are to be made available to users, specifications of the access rights and times at which the access rights or resources will be available. Resource allocation system 1004 can also allocate access rights for resources and facilitate transmissions of notifications of the available rights to a set of user devices. For example, resource allocation system 1004 can alert users of the availability via a website, app page or email. As another example, resource allocation system 1004 can transmit data about access rights and resources to one or more intermediate systems, which can facilitate assignment of access rights (e.g., processing of requests for such rights).

Resource access system 1006 can include one or more servers and one or more networks to facilitate the authentication of the user device that requests access to resource data store 1010. In some cases, resource access system 1006 can facilitate the reassignment of an access right from one user to another. In some cases, resource access system 1006 can enable a user to perform a print operation for printing a physical representation of an access right.

In some examples, resource access system 1006 can include an authentication system 1008. Authentication system 1008 can include one or more servers and one or more networks configured to authenticate a user device that requests access to one or more access rights stored in resource data store 1010 before completing or responding to the request. For example, authentication system 1008 can authenticate the user device by verifying that the request is transmitted from an approved user device. Authentication system 1008 can prevent unauthorized user devices (e.g., hackers or bot users) from interacting with the one or more access rights assigned to a user by requiring authentication prior to granting access to the one or more access rights.

In some cases, authentication system 1008 can authenticate that an authorized user device is requesting to access one or more access rights stored in a data store. Authentication system 1008 can implement authentication using one or more challenge workflows. For example, a challenge workflow (e.g., a factor) can include data representing a process of a challenge, an authentication test, a prompt or request for specific information or evidence of possession of a particular device that is presented to the user (or identified based on interactions with the user), and so on. As a further example, a challenge workflow can include a request to enter a code transmitted to a user's mobile device. When the authentication system 1008 receives the correct code from the mobile device, the authentication test associated with the challenge workflow can be satisfied. As another example, an additional challenge workflow can include a request to scan a user's fingerprint. Upon receiving the correct fingerprint data of the user, the authentication test associated with the challenge workflow is satisfied. When all of the factors presented to the user (or identified from interacting with the user) are satisfied, then authentication system 1008 can grant the user device's request to access one or more access rights associated with the user. According to aspects of the present disclosure, the number and type of challenge workflows that are executed as part of the authentication process is dynamic and scalable based on one or more characteristics of the user device requesting access.

In some examples, authentication system 1008 can scale a number and type of challenge workflows included in the authentication. For example, authentication system 1008 can identify a type of device used to transmit a request to access one or more access rights, and can determine the number of challenge workflows to include in the authentication process. Authentication system 1008 can also determine the type of challenge workflow used in the authentication process based on the type of device used to transmit the request. For example, authentication system 1008 can identify that the request to access one or more access rights stored in a resource data store was transmitted from a mobile device. Authentication system 1008 can determine that the authentication process presented to the user operating the mobile device (e.g., smartphone) includes two challenges before granting the user's request. A first challenge can include a request to enter a password or login credential on the mobile device. A second challenge can include a request to enter a code which was transmitted to the mobile device as a text message. When the user successfully passes the two challenges, authentication system 1008 can grant the user device access to the data store that stores the one or more access rights associated with the user device.

As another example, if the request is transmitted from a server farm (e.g., a hacker or a bot script), authentication system 1008 can identify that the request is transmitted from a server farm and dynamically determine that the authentication process should be difficult because the request may originate from an unauthorized user. As only a non-limiting example, authentication system 1008 can determine that the authentication process will include seven challenges. A first challenge can include a request to enter a password or login credential. A second challenge can include a request to enter a code which was transmitted to the user device using a text message communication channel. A third challenge can include a request to scan a fingerprint. A fourth challenge can include a request to take a picture of a face to compare against the user's previously-stored photograph. A fifth challenge can include a request to interact with other authorized devices (e.g., a smartwatch wirelessly connected to the user device). A sixth challenge can include a request to call a phone number and speak with an agent to verify the requestor's identify. A seventh challenge can include a request to confirm additional details associated with the user. The seven challenges are designed to make it difficult for the unauthorized user to successfully pass all of the challenges.

In some cases, authentication system 1008 can determine the type of device that originally transmits the request based on various information included in the request or information associated with the request. For example, to submit the request to reassign an access right stored in a resource data store, the user may execute a native application on a mobile device and log in. Certain information can be determined during the log in process, for example, a type of device used to log into the account (e.g., a smartphone or desktop).

Authentication system 1008 can also identify an IP address associated with the transmission of the request to determine a location (e.g., request transmitted from the United States or from another country) of the origination of the request.

In some examples, authentication system 1008 can determine a technology footprint of a user. A technology footprint can identify the devices (e.g., user device 1002 and user device 1012, which is wirelessly connected to user device 1002 via communication link 1014) associated with the user. For example, a technology footprint can identify that a user is associated with a laptop, a smartphone, and a smartwatch. Another technology footprint can identify that a user is associated with a desktop. For example, the devices associated with the user can be identified by the user by entering information of each device into the user's profile. As another example, the devices associated with the user can be automatically identified based on interactions with the user (e.g., if the user has downloaded an app on the user's smartwatch or paired a smartwatch with a smartphone). Authentication system 1008 can determine all possible challenge workflows (e.g., a challenge workflow can be a process or workflow to facilitate the challenge) that are associated with the user. One or more challenge workflows can be selected from all possible challenge workflows determined for a particular user. The possible challenge workflows can be different for various users so that all of the possible challenge workflows is specifically determined for each user.

Resource data store 1010 can include servers, data structures, or storage devices that store resource data. Resource data can include data representing resources or access rights to resources. For example, resource data can identify an access right assigned to a user for a particular resource. Resource data store 1010 can be connected to both resource allocation system 1004 and resource access system 1006.

Communication server 1016 can include a server configured to facilitate communications between user device 1002 and resource access system 1006. For example, communication server 1016 can be an email server. The email server can email the user device with a link or a code to be accessed as part of a challenge workflow. As another example, communication server 1016 can include a short message service (SMS) server that can transmit a text message to a mobile device associated with the user. The text message can include a link or a code to be accessed by the user as part of a challenge workflow. It will be appreciated that communication server 1016 can include other servers or systems that can facilitate communication between user device 1002 and authentication system 1008.

Figure 11:
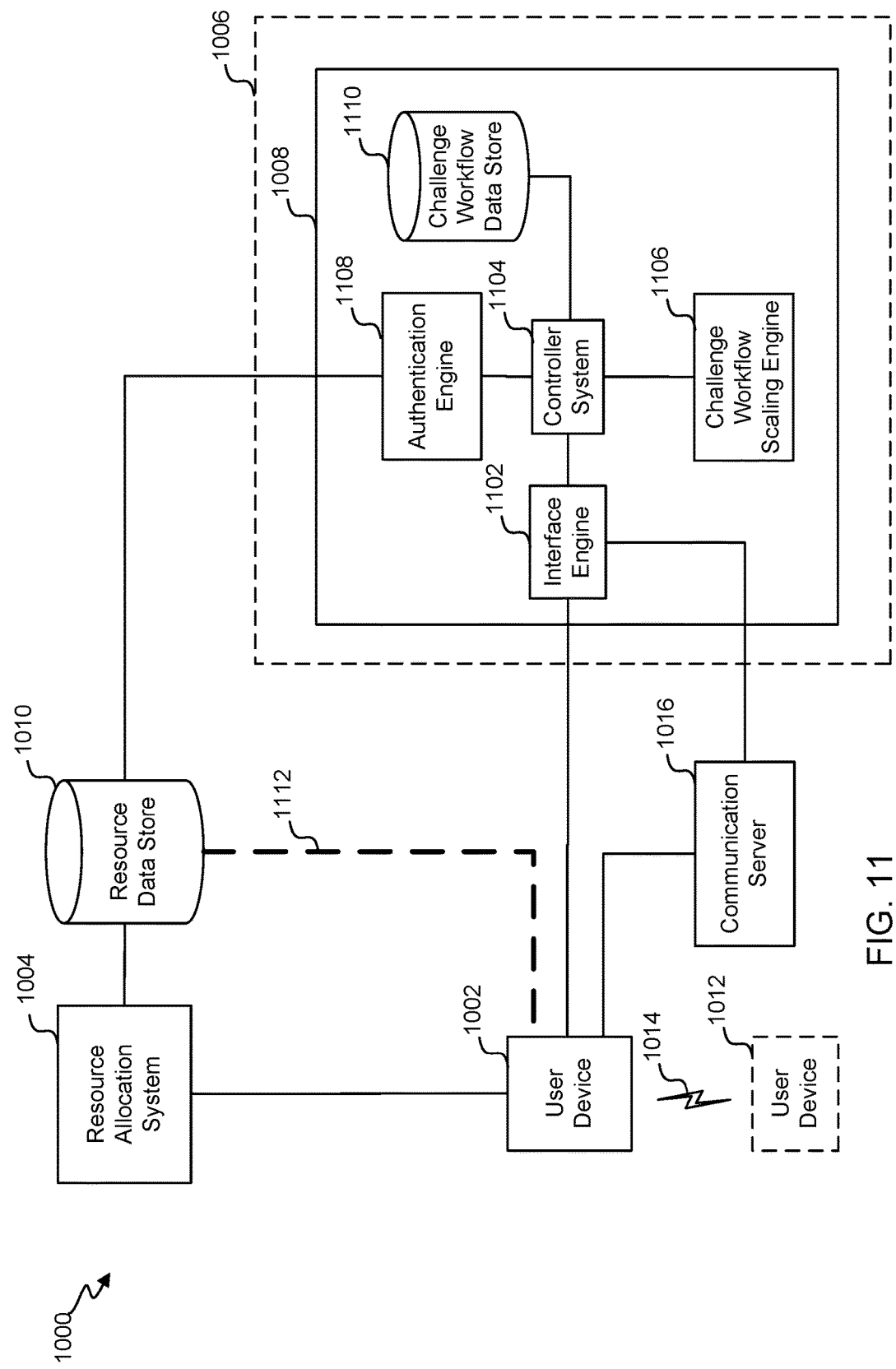
FIG. 11 is a block diagram illustrating another embodiment of a resource access-facilitating interaction system.

FIG. 11 is a block diagram illustrating another embodiment of a resource access-facilitating interaction system 1000. For example, FIG. 11 illustrates a block diagram of authentication system 1008 in the context of resource access-facilitating interaction system 1000. Authentication system 1008 can include interface engine 1102, controller system 1104, challenge workflow scaling engine 1106, authentication engine 1108, and challenge workflow data store 1110.

Interface engine 1102 may be stored in a memory and executable by a processor to receive from user device 1002 a request to access one or more access rights. Interface engine 1102 can receive the request and forward all or part of the request to an specific destination. For example, interface engine 1102 can forward all or part of the request to controller system 1104. Further, interface engine 1102 can convert or transform the request into a format readable by controller system 1104.

Controller system 1104 can include one or more processors configured to control authentication system 1008. For example, controller system 1104 can receive all or part of the request from interface engine 1102. Controller system 1104 can process the request by transmitting all, a portion of, or a transformation of the request to challenge workflow scaling engine 1106. Controller system 1104 can also track the received request by storing the request in a data structure associated with the user transmitting the request or storing an identifier associated with the request.

Challenge workflow scaling engine 1106 may be stored in a memory and executable by a processor to determine a number and type of challenge workflows to include in the authentication process. For example, challenge workflow scaling engine 1106 can process the request or portion of the request received from controller system 1104. Challenge workflow scaling engine 1106 can determine which challenge workflows to include in the authentication process with the user. For example, challenge workflow scaling engine 1106 can determine whether the user is more likely to be an authorized user than an unauthorized user based on several factors. If challenge workflow scaling engine 1106 determines that the user is more likely to be an authorized user, then challenge workflow scaling engine 1106 selects a set of challenge workflows that would cause less friction for the user. For example, the fact that the user is logged into a particular application can be one challenge workflow. Another challenge workflow can be a request for the user to select a link from an email transmitted to the user's email address. This challenge workflow can request that the user select the link on the same user device which transmitted the request. However, if the challenge workflow scaling engine 1106 determines that the user transmitting the request is likely to be a bot user, then challenge workflow scaling engine 1106 can select a set of challenge workflows that makes it more difficult for the user to successfully pass all of the challenge workflows. For example, challenge workflow scaling engine 1106 can select many challenge workflows (e.g., 7 challenge workflows), including, for example, challenge workflows that verify the identity of the requestor is the same as the identity of the user associated with the user profile through which the requestor is transmitting the request. For example, challenge workflow scaling engine 1106 can select a challenge workflow that prompts the user to take a picture of himself or herself so that challenge workflow scaling engine 1106 can match that against a previously-stored picture. Doing so can prevent unauthorized users from unauthorized access to the one or more access rights stored in a resource data store. Challenge workflow scaling engine 1106 selects the set of challenge workflows from a plurality of challenges workflows specifically determined based on information about the user or user's profile.

Challenge workflow scaling engine 1106 transmits identifiers of the selected challenge workflows to controller system 1104. Controller system 1104 can facilitate the challenge workflow so that the challenge can be presented to the user. For example, if a challenge workflow is a request for a user to select a link in an email transmitted to the user device, controller system 1104 can instruct communication server 1016 to transmit an email to the user's email address. Controller system 1104 can also transmit a message to the user device indicating that the user should open the email and select the link using the user device.

Challenge workflow data store 1110 can include one or more servers and networks configured to store the database of challenge workflows. Challenge workflow data store 1110 can also store information associated with challenge workflows, for example, which challenge workflows typically are included together in an authentication process, which challenge workflows typically make the user fail the challenge, which challenge workflows have been satisfied by known hackers/bad actors, etc.

Responses to the challenge workflows can be received from user device 1002 at interface engine 1102. The responses can be transmitted to controller system 1104 to be forwarded to authentication engine 1108. Authentication engine 1108 may be stored in a memory and executable by a processor to authenticate the received responses. In some cases, authentication engine 1108 can determine whether the received responses are correct. For example, a challenge workflow may include a request that the user to select a link in an email received from communication server 1016. Once selected, the link can obtain a device identification (ID) of the user device on which the link was selected. The device ID can be transmitted from the user device (e.g., user device 1002) to authentication engine 1108 via interface engine 1102 and controller system 1104. In this example, authentication engine 1108 can compare the received device ID with a stored device ID associated with the user's profile. If there is a match, then authentication engine 1108 can determine that the user has successfully passed the challenge workflow. If the received device ID does not match a stored device ID associated with the user's profile, then authentication engine 1108 can determine that the user has failed the challenge workflow. It will be appreciated that the stored device ID may be received along with the request when the user executes the application that allows the user to transmit the request.

When authentication engine 1108 determines that the challenge workflows have been successfully passed by the user, authentication engine 1108 can transmit a signal to resource data store 1010. The signal transmitted by authentication engine 1108 can facilitate the establishment of connection 1112 between user device 1002 and resource data store 1010. In some cases, authentication engine 1108 can grant the user's request to access one or more access rights stored in a data store when all or a particular set of challenge workflows have been satisfied by the user. The establishment of connection 1112 can indicate the grant of the user's request to access one or more access rights stored in a data store.

Figure 12:
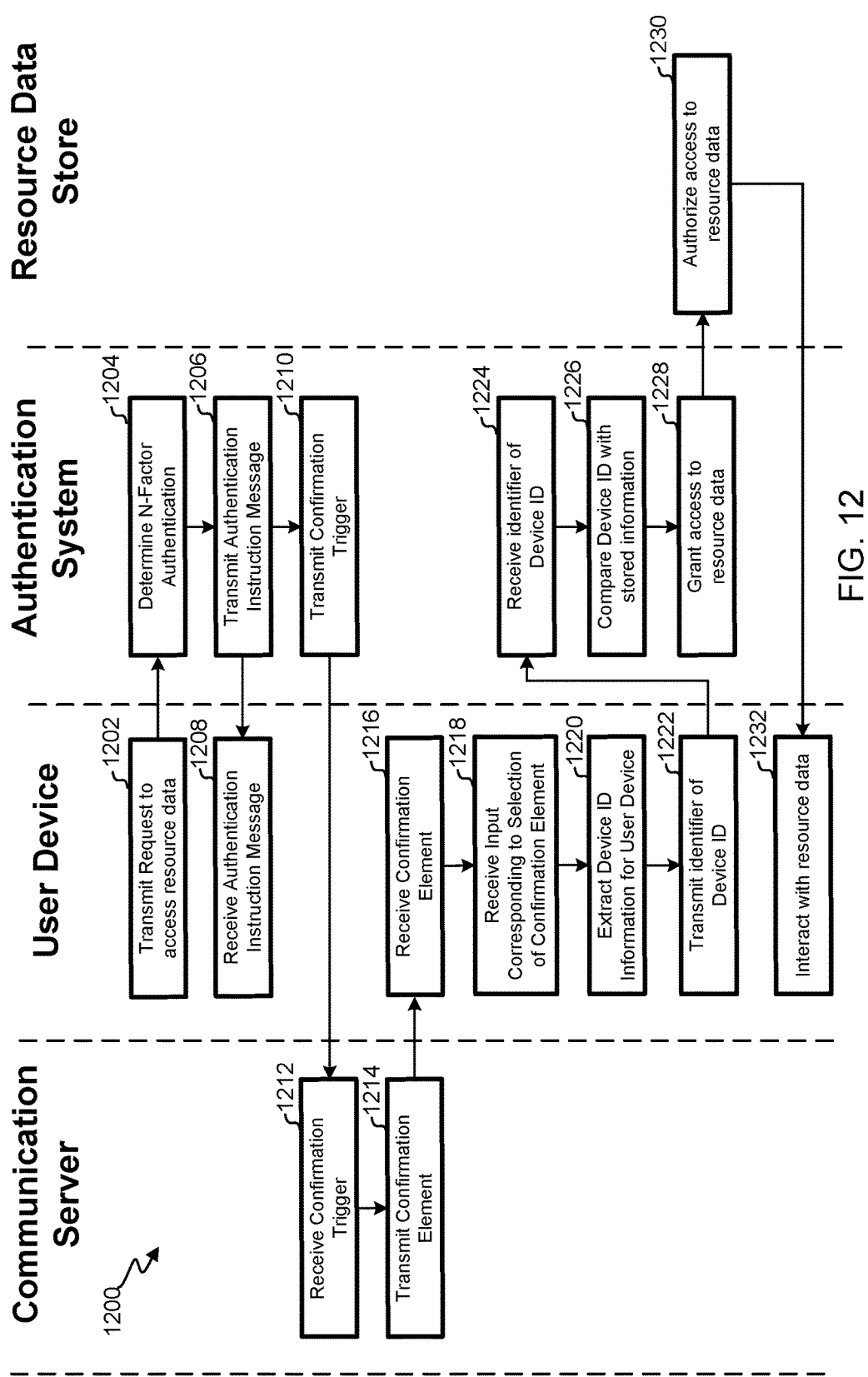
FIG. 12 is a swim lane diagram illustrating a multi-factor authentication process, according to an embodiment.

FIG. 12 is a swim lane diagram illustrating a multi-factor authentication process 1200, according to an embodiment. Multi-factor authentication process 1200 can be performed at least at a communication server (e.g., communication server 1016), a user device (e.g., user device 1002), an authentication system (e.g., authentication system (1008), and a resource data store (e.g., resource data store 1010).

At block 1202, the user device transmits a request to access one or more access rights stored in a data store. The user may first execute an application on the user device (e.g., a mobile device). The user can log into the application with the user's log-in credentials. After successfully logging into the application, the user can view access rights that are assigned to the user. In some cases, the request may be transmitted along with other information. For example, the request may be transmitted to the authentication server along with a device identifier (ID) of the user device on which the request was transmitted. In this example, if the user transmitted the request using his or her smartphone, then the device ID transmitted to the authentication system would be that of the smartphone and would be included in the request (e.g., within a data field of the request).

At block 1204, the authentication system can determine a number and type of challenge workflows to include in the authentication process with the user. In some cases, the authentication system can determine a plurality of challenge workflows that are specifically designed for a particular user based on the user's technology footprint (e.g., an overview of all of the authorized devices used by the user). In these cases, the authentication system can select a set of challenge workflows from the plurality of challenge workflows designed for the user. The authentication system can select the set of challenge workflows based on information included in the request. For example, if the request indicates that the requestor (e.g., the user transmitting the request to access one or more access rights) is requesting to reassign an access right from the requestor to another user (e.g., an expensive ticket to an event with limited space), the authentication may select a set of challenge workflows that ensure that the requestor is actually the user associated with the user profile. In this example, the authentication system may select three challenge workflows, including a request for a fingerprint scan to be compared against fingerprint data stored in the user's profile. In another example, if the request indicates that a user who regularly requests reassignment of access rights to other users is requesting to reassign an access right, the authentication system may select a set of challenge workflows that easily allow access right to be reassigned. In this example, the authentication system may select two simple challenge workflows for the user.

Once the authentication system has determined the number N of challenge workflows and the type of challenge workflows, the authentication system can transmit an authentication instruction message to the user, at block 1206. In some cases, the authentication system can transmit a message to the user device indicating how to respond to the challenge workflows. For example, the authentication system can transmit a message to the user device (e.g., a smartphone) instructing the user to execute an email application and open a particular email received from the authentication system (via the communication server). In some cases, the message may be a text message received at the user device. In other cases, the message may be a push notification that is presented on the user device through the application. At block 1208, the user device may receive and display the message.

At block 1210, the authentication system may transmit a communication trigger to the communication server. Block 1210 is performed when one of the challenge workflows is a request for a user to click a link in an email or text message received at the user device. The communication trigger includes a signal that triggers the communication server to send an email or text message to the user device. The communication trigger may include identification information of the user and user device. For example, the communication trigger may include a message and email address, which the communication server can use to transmit an email message to the user's email address. In some cases, the communication trigger may instruct the communication server to send an email including a selectable element (e.g., a hyperlink). In these cases, when the hyperlink is ultimately selected by the user, the device ID of the device on which the hyperlink was selected is transmitted back to the authentication server.

At block 1212, the communication server receives the communication trigger. In some cases, the communication server can be an email server. In other cases, the communication server may be an SMS server that can facilitate transmission of text messages. When the communication trigger is received at the communication server, the communication server prepares the communication (e.g., email or text message) to be transmitted to the user. If the communication server is an email server, the communication server may transmit an email to a user's personal email address. If the communication server is an SMS server, the communication server may transmit a text message to the user device.

At block 1214, the communication server may transmit the message (via email or text message) to the user. The message can include a confirmation element (e.g., a hyperlink) which can be selected by the user. Upon selecting the confirmation element, the device ID of the device on which the confirmation element was selected is determined.

At block 1216, the user receives the confirmation element. For example, the confirmation element can be included in an email and transmitted to the user's email address. The email can be opened by executing an email application on the user device and opening the email transmitted by the communication server. In some cases, the confirmation element can be a text message. In these cases, the text message can be received at the user device.

At block 1218, the user device can receive an input corresponding to a selection of the confirmation element (e.g., the hyperlink). For example, the user can touch a touchscreen of the user device to select the confirmation element. In other examples, the user can click on the confirmation element using a stylus pen our a mouse icon.

At block 1220, the selection of the link initiates an extraction of the device ID of the device on which the link was selected. In some cases, the link can be a deep link that directs the user back to the application and indicates to the user that the request has been completed. In other cases, the link can initiate or trigger a code that accesses the identification information of the device on which the link was selected. At block 1222, the obtained device ID is transmitted to the authentication system. At block 1224, the obtained device ID is received at the authentication system. The device ID can be stored, processed, and analyzed.

At block 1226, the authentication system compares the obtained device ID with the device ID that was previously received by the authentication system (e.g., at block 1202). For example, the authentication system can receive the device ID of the device that originated the request. In this example, the request can originate when the user device receives input corresponding to a selection (e.g., by a user) of a button or link associated with requesting access to one or more access rights. The request can be transmitted with the device ID of the device transmitting the request (e.g., the user's smartphone). In some cases, the device ID can be stored in association with the user's profile. In these cases, when the user initially registers with the resource access system, the user can input the device ID of the user's smartphone, for example. The device ID can also be automatically extracted at the time of registration. The second device ID received at the authentication system is the ID of the device on which the link was selected. The authentication system compares these two links and determines whether or not a match exists. When a match exists, the authentication system has authenticated the user device because the authentication system has received proof (e.g., by way of receiving the device ID after the user selects or clicks the link) that the user is operating the user device. Further, when the device ID associated with the initial request to access one or more access rights stored in a data store matches the device ID of the device on which the link was selected, then the multi-factor authentication process 1200 proceeds block 1228 where the request is granted.

At block 1230, the user is granted access to the resource data store. For example, a link between the authorized user device and the resource data store can be established. In some cases, the user device can gain access to one or more access rights stored in a data store without having to be re-authorized. In other cases, the user can periodically or randomly be required to re-authorize the user device by repeating the steps in process 1200 again.

At block 1232, the user device can interact with the resource data store because a link has been established between the user device and the resource data store. The resource data store can allow access to resource data because the user device is authorized, and the authentication system has sufficiently proven that the user who is requesting to access the data store is authorized to do so.

Multi-factor authentication process 1200 can prevent a hacker from accessing the one or more access rights stored in the data store if the hacker gained unauthorized access to a user's profile, the hacker will not likely also have overtaken the user's personal email address or the user's personal mobile device. The authentication can prevent these unauthorized users from interacting with the user's access rights by requiring the requestor to select a link from a personal email address using the user's mobile device, for example.

Figure 13:
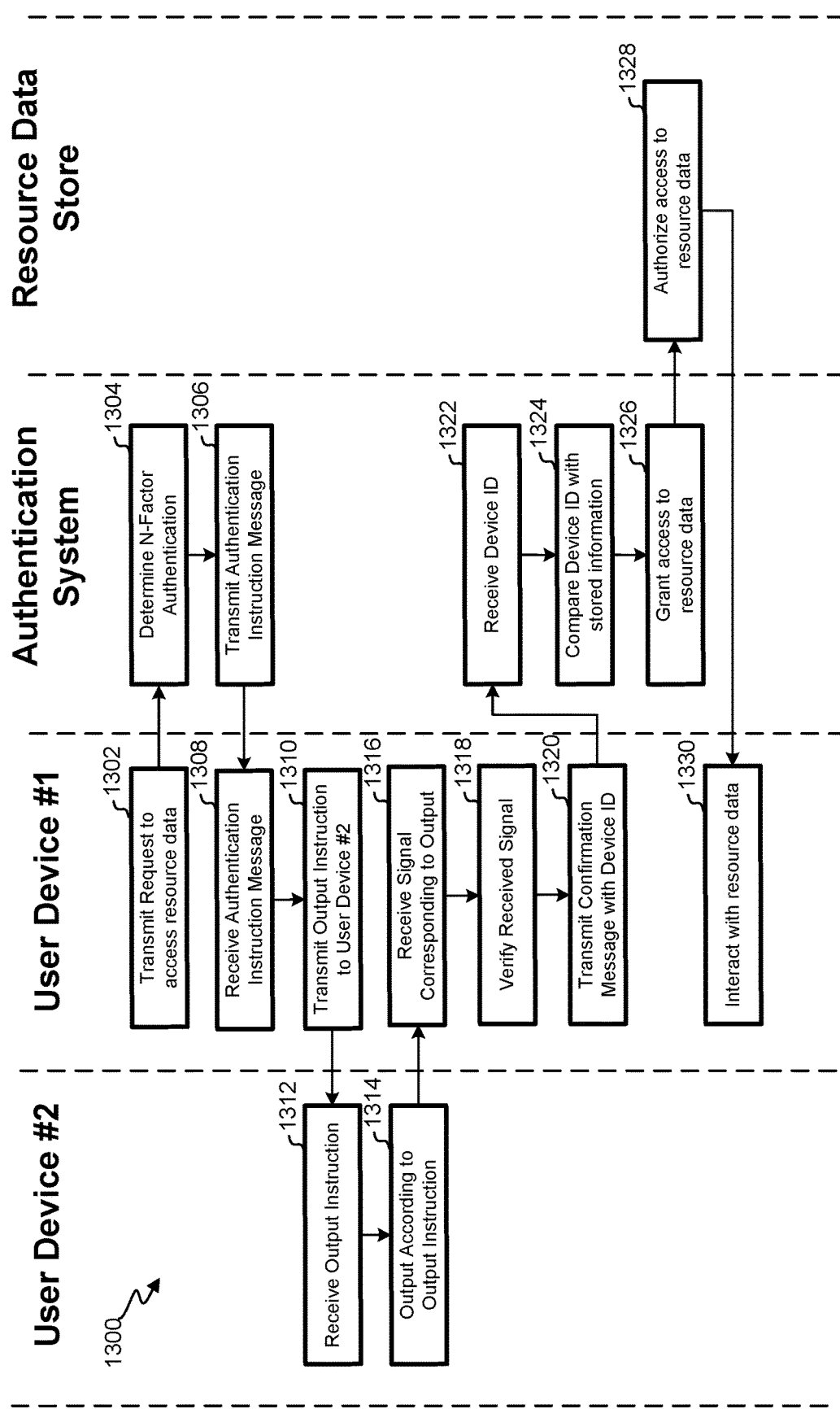
FIG. 13 is a swim lane diagram illustrating a multi-factor authentication process according to another embodiment.

FIG. 13 is a swim lane diagram illustrating multi-factor authentication process 1300 according to another embodiment. Multi-factor authentication process 1300 can be performed at least at a communication server (e.g., communication server 1016), a user device (e.g., user device 1002), an authentication system (e.g., authentication system (1008), and a resource data store (e.g., resource data store 1010). Multi-factor authentication process 1300 makes use of the fact that many users have more than one device (e.g., a smartphone, a smartwatch, a tablet, etc.). Multi-factor authentication process 1300 requires the user to place a secondary device (e.g., user device #2) in a vicinity near a primary device (user device #1, e.g., a smartphone) so that a particular sound emitted from user device #2 can be received and verified by user device #1. Multi-factor authentication process 1300 ensures that the individual requesting to access the one or more access rights stored in the data store is in possession of the user device and any other authorized or approved devices. For example, the secondary devices associated with a user can be inputted into a user profile by the user so that the authentication system knows an identify of any secondary devices.

At block 1302, user device #1 transmits a request to access one or more access rights stored in a data store. For example, user device #1 may transmit the request in order to request reassignment of the one or more access rights to another user device associated with another user. The user may first execute an application on the user's user device (e.g., a smartphone). The user can log into the application with the user's log-in credentials. After successfully logging into the application, the user can view the access rights that are assigned to the user. In some cases, the request may be transmitted along with other information. For example, the request may be transmitted to the authentication server along with a device identifier (ID) of the user device on which the request was transmitted. In this example, if the user transmitted the request using his or her smartphone, then the device ID transmitted to the authentication system would be that of the smartphone and would be included in the request.

At block 1304, the authentication system can determine a number and type of challenge workflows to include in the authentication process with the user. In some cases, the authentication system can determine a plurality of challenge workflows that are specifically designed for a particular user based on the user's technology footprint (e.g., an overview of all of the authorized devices used by the user). In these cases, the authentication system can select a set of challenge workflows from the plurality of challenge workflows designed for the user. The authentication system can select the set of challenge workflows based on information included in the request. For example, if the request indicates that the requestor (e.g., the individual initiating the transmission of the request) is requesting to reassign particular access rights (e.g., high-value electronic tickets to an event with limited space), the authentication may select a set of challenge workflows that ensure that the requestor is actually the user associated with the user profile. In this example, the authentication system may select three challenge workflows, including a request for a fingerprint scan to be compared against fingerprint data stored in the user's profile. In another example, if the request indicates that a user who regularly requests reassignment is requesting reassignment of an access right, the authentication system may select a set of challenge workflows that easily allow the user to reassign the access right to another user. In this example, the authentication system may select two simple challenge workflows for the user.

Once the authentication system has determined the number N of challenge workflows and the type of challenge workflows, the authentication system can transmit an authentication instruction message to the user, at block 1306. In some cases, the authentication system can transmit a message to the user device indicating how to respond to the challenge workflows. For example, the authentication system can transmit a message to the user device (e.g., a smartphone) instructing the user to position any secondary devices (e.g., smartwatches) into a vicinity of user device #1. At block 1308, the user device may receive and display the authentication instruction message.

At block 1310, user device #1 can transmit an output instruction to user device #2. The output instruction can instruct user device #2 to output a sound or vibration, which can be heard at user device #1. The output instruction can be transmitted to user device #2 over a short-range communication link (e.g., a Bluetooth link).

At block 1312, user device #2 can receive the output instruction from user device #1. At block 1314, user device #2 can output a sound or vibration according to the output instruction. In some cases, the output can be a sound outputted by user device #2. In other cases, the output can be a pattern of vibration outputted by user device #2.

At block 1316, user device #1 receives the output sound of user device #2. For example, a microphone of user device #1 can receive the output sound or the sound from the vibration of user device #2. The authentication system can verify that user device #1 is near an authorized device (e.g., user device #2) because user device #1 picked up the sounds outputted by user device #2.

At block 1318, user device #1 can verify the received output sound. Verifying the output sound can include comparing the output instruction with the received sound. For example, the output instruction may indicate the sound that is outputted by user device #2. This allows user device #1 to verify that the sound it received from user device #2 is accurate.

At block 1320, the obtained device ID of user device #1 can be extracted and transmitted to the authentication system, along with a confirmation message. At block 1322, the obtained device ID is received at the authentication system. The device ID can be stored, processed, and analyzed.

At block 1324, the authentication system compares the obtained device ID with the device ID that was previously received by the authentication system (e.g., at block 1302). For example, the authentication system can receive the device ID of the device that originated the request. request can be transmitted with the device ID of the device transmitting the request (e.g., the user's smartphone). In some cases, the device ID can be stored in association with the user's profile. In these cases, when the user initially registers with the resource access system, the user can input the device ID of the user's smartphone, for example. The device ID can also be automatically extracted at the time of registration. The second device ID received at the authentication system is the ID of the device on which the link was selected. The authentication system compares these two links and determines whether or not a match exists. When a match exists, the authentication system has authenticated the user device because the authentication system has received proof (e.g., by way of receiving the device ID after the user selects or clicks the link) that the user is operating the user device. Further, when the device ID associated with the initial request matches the device ID of the device on which the link was selected, then the multi-factor authentication process 1300 proceeds block 1326 where the user's request to access one or more access rights stored in the data store is granted.

At block 1328, the user is granted access to the resource data store. For example, a link between the authorized user device and the resource data store can be established. In some cases, the user can freely access one or more access rights stored in a data store without having to be re-authorized. In other cases, the user can periodically or randomly be required to re-authorize the user device by repeating the steps in process 1300 again.

At block 1330, the user device can interact with the resource data store because a link has been established between the user device and the resource data store. The resource data store can allow access to resource data because the user device is authorized, and the authentication system has sufficiently proven that the user who is requesting to access one or more access rights stored in a data store is authorized to access and interact (e.g., request reassignment of the one or more access rights to another user, perform a print operation corresponding to the access right, and so on) with the one or more access rights.

Multi-factor authentication process 1300 can prevent a hacker from improperly gaining access to the one or more access rights associated with a user's profile, and the hacker will not likely also have overtaken other user devices (e.g., smartwatches, tablets, etc.) operated by the user. Embodiments of the present disclosure can prevent these hackers from interacting with the access rights associated with users by requiring the requestor (e.g., the originator of the request) to receive a signal from a secondary device (e.g., a smartwatch) associated and approved by the user who is associated with the user profile.

It will be appreciated that if User Device #2 detects a particular signal (e.g., a predefined audio or video signal), User Device #2 can transmit a communication message to User Device #1. For example, when the communication message is received at User Device #1, the communication message (e.g., via a carrier signal) can cause or trigger one or more processes or events to be initiated at User Device #1. Examples of processes or events can include a notification of unassigned access rights for a resource, a notification to request reassignment of an access right assigned to the user associated with User Device #1, an initiation of executing a native application on User Device #1 (e.g., if User Device #1 is a smartphone), and other suitable processes or events. It will also be appreciated that User Device #2 can be used to authenticate the user operating User Device #1 (e.g., instead of using authentication processes that prompt inputs from the user operating User Device #1). For instance, User Device #2 can detect an ambient sound or light, and use the detected ambient sound or light to determine which of one or more protocols to use for communicating with User Device #1 for authentication purposes. For example, if the ambient sound is detected as being noisy, User Device #2 can determine that a protocol of using tapping or vibrating of the devices is to be used over protocols that use sound inputs. In this example, authentication of the user can be performed by vibrating User Device #2 in a particular pattern, and requesting that the user tap on User Device #1 using the vibration pattern.

Figure 14:
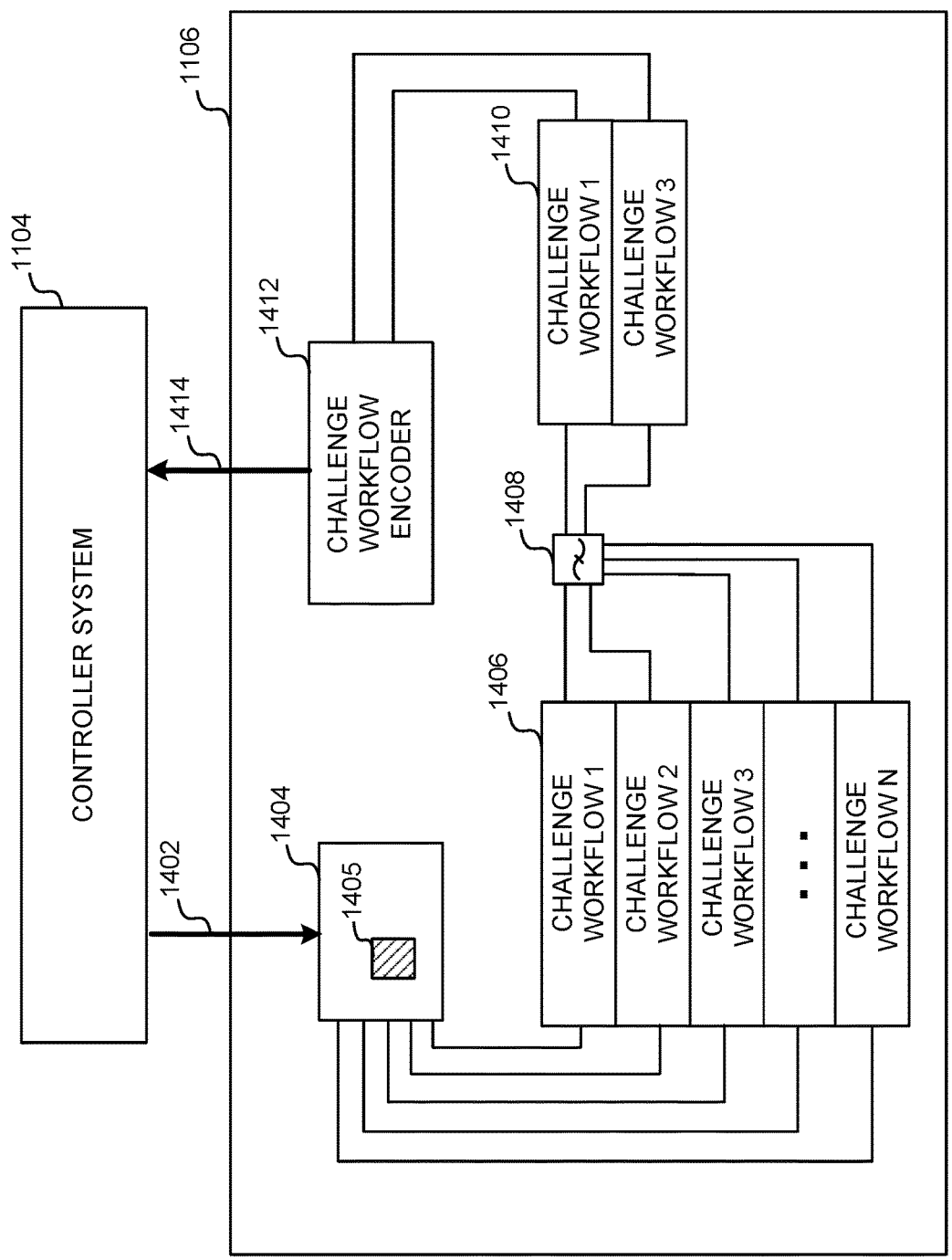
FIG. 14 is a block diagram of a challenge workflow scaling system according to an embodiment.

FIG. 14 is a block diagram of challenge workflow scaling engine 1106 according to an embodiment. In some cases, a plurality of challenge workflows can be specifically tailored to a user device. For example, a user device (e.g., an IPHONE) can be associated with a set of challenge workflows that is specific to the user device. Challenge workflow scaling engine 1106 can select a subset of challenge workflows from the set of all available challenge workflows based on information included in the request (e.g., the request to access the resource data store that is received from the user device). For example, the request can include a device identifier that characterizes an attribute of the user device that transmitted the request. In some instances, the attribute can represent the type of computing device of the user device. Examples of types of computing devices include a mobile device (e.g., a smartphone), a server, a desktop, a tablet device, an electronic kiosk, and other suitable devices. In some examples, the device identifier may characterize other attributes of the user device, including, for example, the operating system operating on the user device, the network speed at the user device, whether or not a particular native application is executing on the user device, and so on. In some examples, the device identifier can be extracted (e.g., by an authentication system) from the request (or communication). For example, the device identifier can be included in a data field of the request, and that data field can be extracted to identify the device identifier.

The selection of a subset of challenge workflows can be considered a scaling of challenge workflows because, for example, challenge workflow scaling engine 1106 may select two challenge workflows for one device and five challenge workflows for another device. In some examples, challenge workflow scaling engine 1106 can calculate a score for each of the plurality of challenge workflows and filter the calculated scores so that only a select few challenge workflows remain for execution. These selected challenge workflows can ultimately be used in the authentication process with the user. In some instances, calculating the score can be based on predefined rules. For example, a predefined rule can include a process for calculating a high score for a user device that transmitted a request to access the resource data store via a particular native application executing on the user device. In some cases, the defined rule can calculate a very low score when the request is received from a server (e.g., from a bot or software program running on a server). The predefined rules can be configured to generate higher scores for certain challenge workflows when the requests are received from mobile devices (e.g., smartphones or tablet devices which are commonly associated with human users). Further, the predefined rules can be configured to generate lower scores for certain challenge workflows when the requests are received from non-portable computing devices (e.g., desktop computer, server farms, etc., which are commonly associated with bot users). It will be appreciated that lower scores can be calculated when requests are received from mobile devices and higher scores can be calculated when requests are received from non-portable devices.

In some cases, the rules for calculating scores for challenge workflows can be dynamically configured based on machine-learning techniques or big data analytics. For example, a rule for calculating a score for a challenge flow can be high when the request (received from a user device) was received from an IP address associated with a particular geographical region (e.g., a neighborhood or city). In this example, if, at any time, the authentication system determines that the IP address or the geographical region is associated with a request received from a bot user, then the authentication system may dynamically reconfigure the rule, such that the rule calculates a score for the challenge flow that is low when the request is received from the IP address associated with the particular geographical region.

Controller system 1104 can communicate with challenge workflow scaling engine 1106. For example, controller system 1104 can transmit request 1402 to challenge workflow scaling engine 1106. The request 1402 can be a request to access one or more access rights stored in the resource data store. For example, the one or more access rights can be assigned to the user operating the user device. In some cases, request 1402 may be a signal or communication that originates from the user device and may be forwarded to challenge workflow scaling engine 1106 via controller system 1104.

Challenge workflow scaling engine 1106 can include buffer 1404, data structure 1406 for the total challenge workflow set, filter 1408, data structure 1410 for the selected challenge workflows to be used in the authentication process, and challenge workflow encoder 1412. Data element 1405 can be stored in buffer 1404. Data element 1405 can correspond to all of, a portion of, or a transformation of the request to transfer resources.

Data structure 1406 can store the total set of challenge workflows for the user device associated with the request 1402. For example, data structure 1406 can store challenge workflows 1 through N. Each of the challenge workflows can include data identifying the workflow involved in facilitating the challenge. For example, a challenge workflow that requires a user to enter a code received as a text message can include data instructing the authentication system to generate the code and transmit the code to the user device. As another example, the challenge workflow can include data for executing the workflow for facilitating the challenges.

In some cases, challenge workflow scaling engine 1106 can calculate a score for each challenge workflow based on data element 1405. For example, when data element 1405 includes certain information (e.g., an indication that the request originated from a smartphone), then certain challenge workflows may correspond to higher scores (or lower scores depending on the embodiment). For example, when data element 1405 includes a device identifier that the request originated from a smartphone, a challenge workflow that facilitates transmitting an email including a link to the user's personal email address can correspond to a high score, whereas, a challenge workflow that requests a fingerprint scan can receive a low score. In some cases, challenge workflows having high scores can correspond to candidates for the subset of challenge workflows ultimately used in the authentication process. In other cases, challenge workflows having low scores can correspond to the candidates for the subset of challenge workflows.

As only a non-limiting example, in FIG. 14, the score for challenge workflow 1 can be "89," the score for challenge workflow 2 can be "52," the score for challenge workflow 3 can be "73." The scores are inputted into filter 1408. For example, filter 1408 can filter out (e.g., reject) challenge workflows having a score of "75" of less. In this example, challenge workflow 1 would pass through filter 1408 and challenge workflow 2 would be rejected. Challenge workflow 3 can pass through filter 1408 or be rejected by filter 1408, depending on the embodiment. In some cases, filter 1408 can strictly filter out scores based on a defined threshold (e.g., "75" or less, as in the example above). In these cases, any score that does not reach the threshold of filter 1408 is rejected. In other cases, filter 1408 can be less strict. For example, while filter 1408 is set at "75," filter 1408 can still allow scores of 70 over more to pass through.

Data structure 1410 can store the challenge workflows that pass through filter 1408. In the example of FIG. 14, challenge workflows 1 and 3 pass through filter 1408 and are stored in data structure 1410. Challenge workflow scaling engine 1106 can use the challenge workflows included in data structure 1410 as the challenge workflows for the authentication process. In some cases, a challenge workflow being stored in data structure 1410 can correspond to a selection of the challenge workflow for the authentication process.

Once the challenge workflows are selected (e.g., challenge workflows 1 and 3) from the total set of challenge workflows (e.g., challenge workflows 1 through N), challenge workflow encoder 1412 can encode the selected challenge workflows to be transmitted to controller system 1104. For example, challenge workflow encoder 1412 can determine identifiers of the selected challenge workflows. Challenge workflow encoder 1412 can transmit the identifiers of the selected workflows to controller system 1104. Controller system 1104 can facilitate execution of the selected challenge workflows.

It will be appreciated that any number of filters can be used as filter 1408 (e.g., one-stage filters, two-stage filters, etc.). Further, it will also be appreciated that low scores may correspond to candidates for selection of challenge workflows. It will also be appreciated that challenge workflow encoder 1412 may or may not be included in challenge workflow scaling engine 1106.

Figure 15:
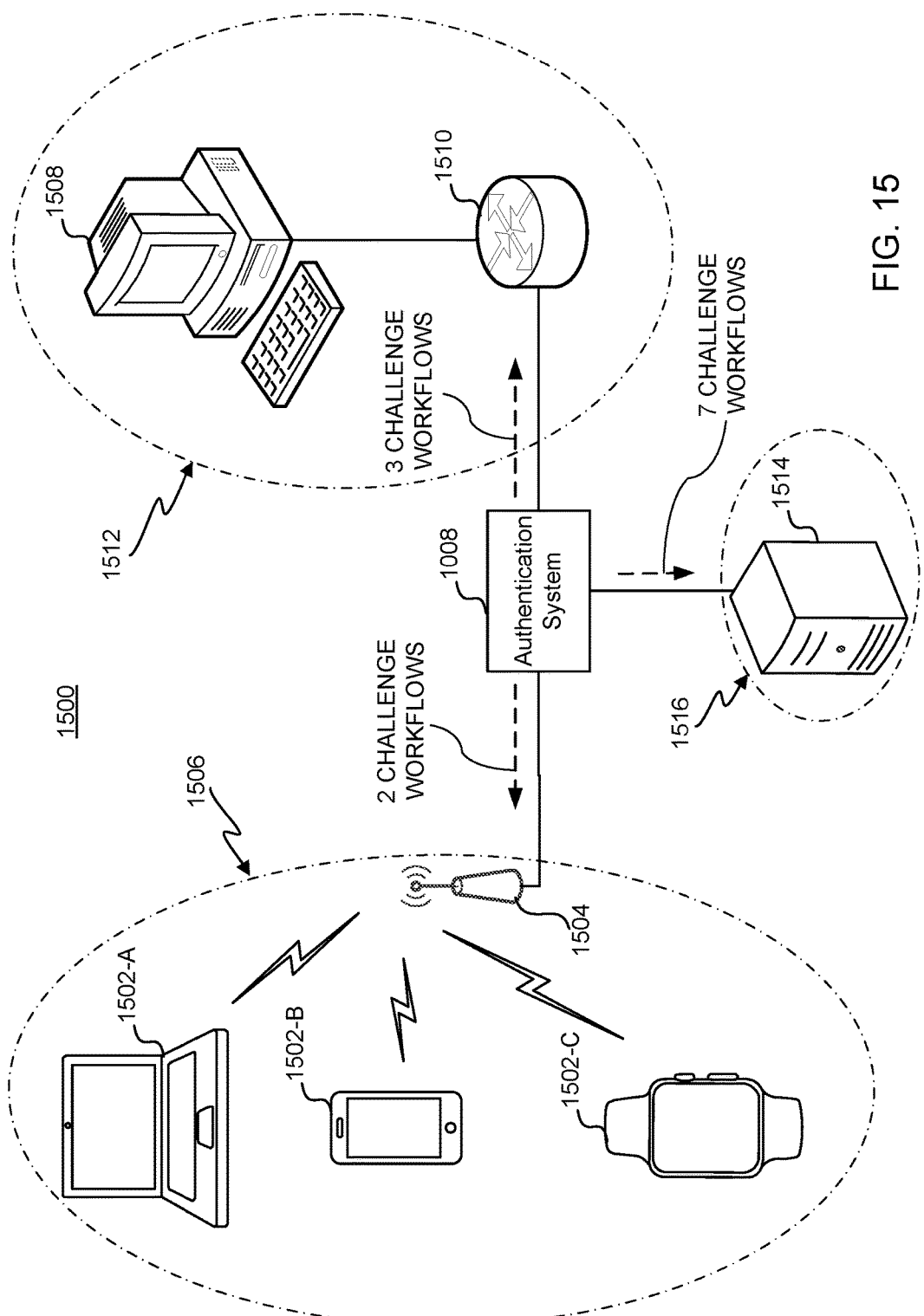
FIG. 15 is a block diagram illustrating an example of determining a user footprint for scaling challenge workflows according to an embodiment.

FIG. 15 is a block diagram illustrating an example of determining a user's technology footprint for scaling challenge workflows according to an embodiment. Environment 1500 can include users 1506, 1512, and 1516. Users 1506, 1512, and 1516 can each be associated with a technology footprint. A technology footprint can identify devices that are associated with a user. The devices may be devices that are known to authentication system 1008. For example, when a user creates a profile with authentication system 1008, the user can identify the devices associated with the user (e.g., smartphones, smartwatches, tablets, etc.).

User 1506 can be associated with laptop 1502-A, smartphone 1502-B, and smartwatch 1502-C. For example, user 1506 can own laptop 1502-A, smartphone 1502-B, and smartwatch 1502-C. Further, each of laptop 1502-A, smartphone 1502-B, and smartwatch 1502-C can be configured to wirelessly communicate with wireless gateway 1504. Authentication system 1008 can identify each device 1502-A, 1502-B, and 1502-C. User's technology footprint can correspond to devices 1502-A, 1502-B, and 1502-C. Authentication system 1008 can compile a set of challenge workflows that are specifically tailored for user 1506's technology footprint. For example, authentication system 1008 can determine that user 1506 is likely to be a human who is appropriately using services (e.g., not a bot user, bad actor, or hacker) because user has a technology footprint similar to an average user. Authentication system 1008 can compile a set of challenge workflows (e.g., 4 workflows) that are not difficult to pass or satisfy because user 1506 is likely a human user (instead of a bot user). The set of challenge workflows can include all possible challenge workflows from which a subset of challenge workflows is selected for the authentication process. In some cases, the selection of the subset of challenge workflows can be based on information included in the request to access one or more access rights stored in a data store transmitted by the user device. In the example of FIG. 15, authentication system 1008 can select two challenge workflows from the tailored set of challenge workflows for the authentication process of user 1506.

User 1512 can be associated with desktop 1508 which is hardwired to router 1510. User 1512's technology footprint can correspond to desktop 1508. Authentication system 1008 can compile a set of challenge workflows that are specifically tailored for user 1512's technology footprint. For example, authentication system 1008 can determine that user 1512 is likely to be a human, but could possibly be a hacker because user 1512 has a technology footprint similar to known hackers. Authentication system 1008 can compile a set of challenge workflows (e.g., 5 workflows) that have an average difficulty to pass or satisfy because user 1506 could potentially be a hacker. The set of challenge workflows can include all possible challenge workflows from which a subset of challenge workflows is selected for the authentication process. In some cases, the selection of the subset of challenge workflows can be based on information included in the request transmitted by the user device. In the example of FIG. 15, authentication system 1008 can select three challenge workflows from the tailored set of challenge workflows for the authentication process of user 1512. For example, authentication system 1008 may select a challenge workflow that requires user 1512 to submit a fingerprint scan to verify that user 1512 is authorized to access a particular user profile. For example, user 1512 can be logged into a user's profile, and authentication system 1008 can match fingerprint data included in the user's profile with fingerprint data received from user 1512 to verify that user 1512 is the actual owner of the user's profile.

User 1516 can be associated with server farm 1514. User 1512's technology footprint can correspond to server farm 1514. Authentication system 1008 can compile a set of challenge workflows that are specifically tailored for user 1516's technology footprint. For example, authentication system 1008 can determine that user 1516 is likely bot user because user 1516 is transmitting a request to access one or more access rights stored in a data store from a server farm. Authentication system 1008 can compile a set of challenge workflows (e.g., 10 workflows) that have a high difficulty to pass or satisfy because user 1516 is likely bot user. The set of challenge workflows can include all possible challenge workflows from which a subset of challenge workflows is selected for the authentication process. In some cases, the selection of the subset of challenge workflows can be based on information included in the request transmitted by the user device. In the example of FIG. 15, authentication system 1008 can select seven challenge workflows from the tailored set of challenge workflows for the authentication process of user 1516. For example, authentication system 1008 may select a challenge workflow that requires user 1516 to submit a fingerprint scan and a picture of user 1516's face to verify that user 1516 is authorized to access a particular user profile. For example, user 1516 can be logged into a user's profile, and authentication system 1008 can match fingerprint data and face image data included in the user's profile with fingerprint data and face image data received from user 1516 to verify that user 1516 is the actual owner of the user's profile.

Figure 16:
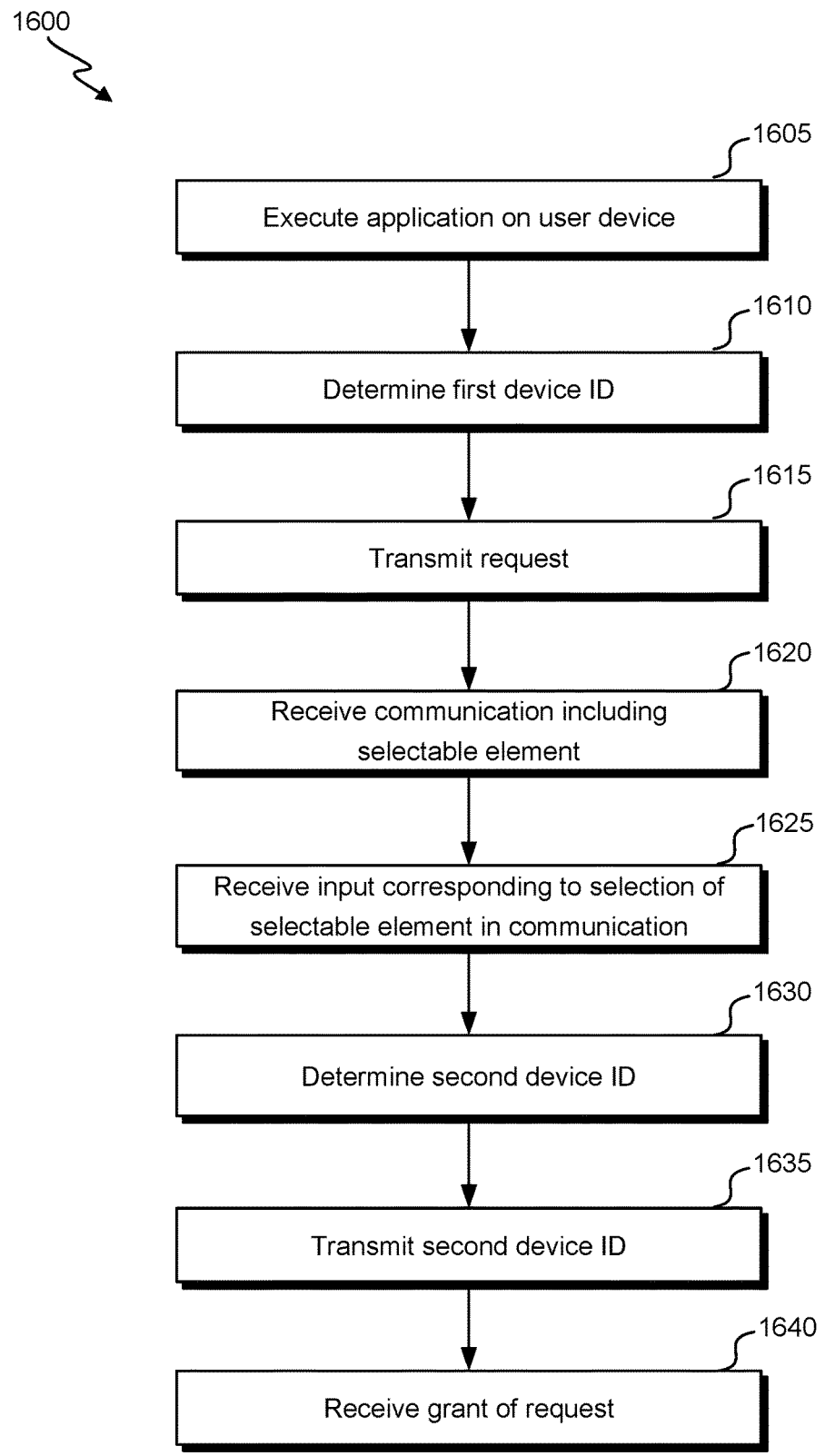
FIG. 16 is a flowchart illustrating a process for multi-factor authentication according to an embodiment.

FIG. 16 is a flowchart illustrating process 1600 for multi-factor authentication according to an embodiment. Process 1600 can be performed all, or in part, at a user device (e.g., user device 1002). Further, process 1600 can authenticate a user device by emailing a user's personal email address and requiring that the user select a link in the email while using the user device.

At block 1605, a user can execute an application on a user device (e.g., a smartphone). For example, a user can simply tap on a touchscreen of the user device to select an application. Further, the user can log into the application using the user's log-in credentials. The user can view assigned access rights while logged into the application.

At block 1610, a first device identification code (ID) can be determined when the user logs into the application. For example, when the user logs into the application, the application can determine a device ID of the device executing the application. It will be appreciated that the device ID can be determined at other times. For example, a device ID can be determined initially when the user first registers for a profile.

At block 1615, a request to access a data store (e.g., to access one or more access rights stored in the data store) can be transmitted by the user device. For example, while logged into the application, the user can view all or a portion of the assigned access rights. The user can select an assigned access right and view additional information associated with that access right, request that the assigned access right be reassigned to another user, or perform a print operation corresponding to the assigned access right.

In some cases, the request may be transmitted along with other information. For example, the request may be transmitted with a device ID of the device transmitting the request. It will also be appreciated that the device ID can be determined and transmitted to the authentication system in other ways.

At block 1620, the user device can receive an email at the user's personal email address. The authentication system can process the user's request, and prior to allowing the user to access the one or more access rights, the authentication system can verify the identity of the user. As part of the authentication process, the authentication system can transmit or cause to be transmitted an email to the user's personal email address. The email can include a link. The link can extract or obtain a device ID of the device on which the link was selected. The device ID can then be transmitted back to the authentication system for verification.

At block 1625, a user can open the received email and select the link included in the email. At block 1630, selection of the link can cause the extraction of a second device ID. The second device ID can be a device ID of the user device on which the link was selected. For example, if the user selects the link from a smartphone, the second device ID can be the device ID of the smartphone. If the user selects the link from a smartwatch, the second device ID can be the device ID of the smartwatch. In some cases, when the user transmits the request from a smartphone, and later selects the link included in the email on a tablet device, the authentication system can instruct the user to select the link from the device, which was used to transmit the request. At block 1635, the second device ID can be transmitted to the authentication system.

At block 1640, the user device can receive a grant of the request to access a data store storing one or more access rights associated with the user device. In some cases, when the first device ID matches the second device ID, then the authentication system can grant the user's request. In other cases, when the first device ID does not match the second device ID, then the user device can be provided with one or more warnings to select the link from the device originating the request. In other cases, the authentication process can be terminated if the first device ID does not match the second device ID.

Figure 17:
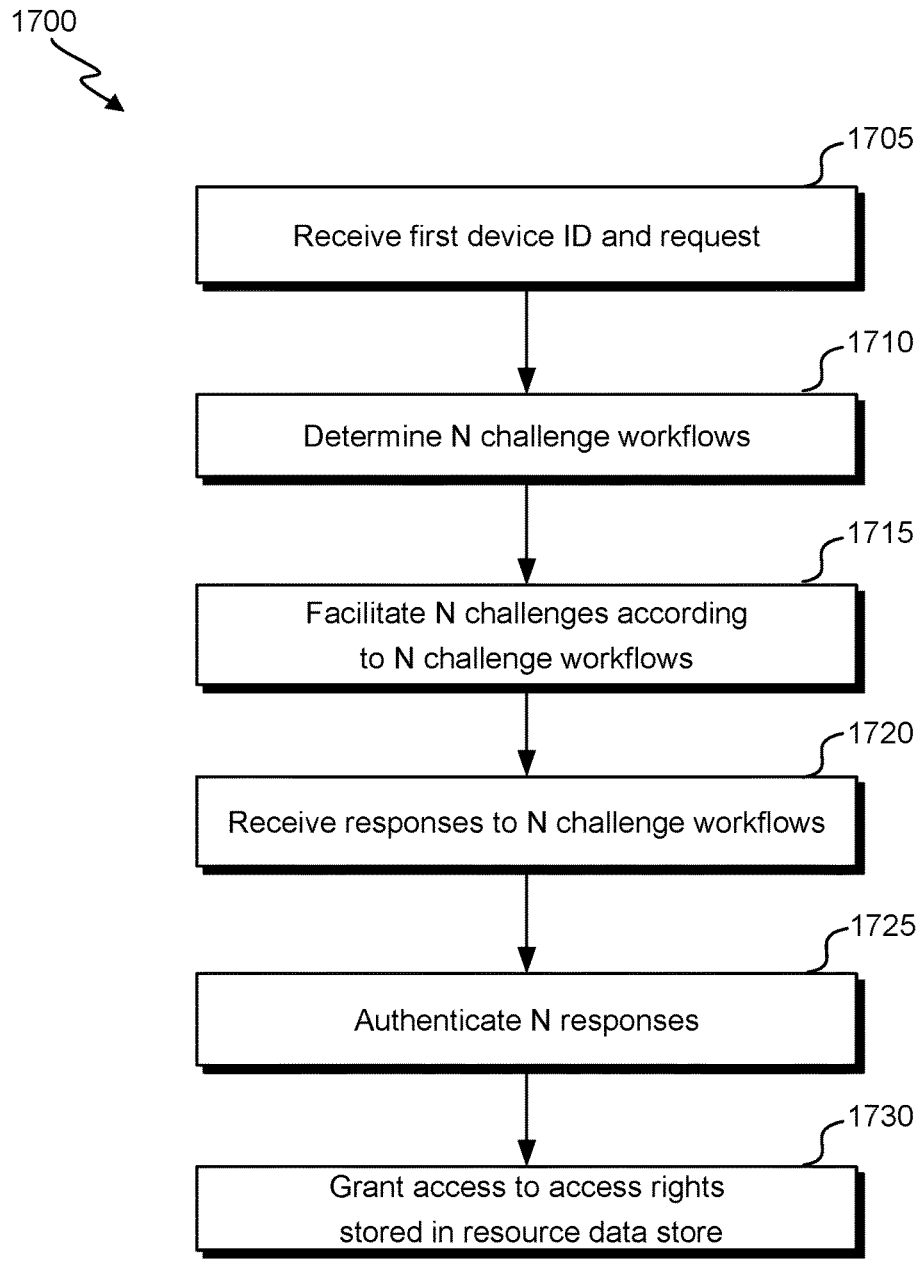
FIG. 17 is a flowchart illustrating a process for scaling challenge workflows according to an embodiment.

FIG. 17 is a flowchart illustrating process 1700 for scaling challenge workflows according to an embodiment. All or a portion of process 1700 can be performed at an authentication system (e.g., authentication system 1008). Further, process 1700 can scale N-challenge workflows used in the authentication process before granting the request to access the data store. The scaling of the N-challenge workflows can include selecting a different number of challenge workflows for different devices or different situations. Process 1700 can also be used to determine the total set of challenge workflows from which a subset of challenge workflows is selected for the authentication process.

At block 1705, the authentication system can receive the first device ID and the request to access the data store. In some cases, the first device ID can be retrieved from another location (e.g., another storage server) and is not included with the request. In some cases, the first device ID corresponds to the device ID of the user device which originated the request. For example, if the user selects the "transfer" button on a smartphone, the first device ID can be the device ID of the smartphone.

At block 1710, the authentication server determines the number N of challenge workflows to be included in the authentication process. In some cases, a subset N of challenge workflows can be selected from a total set M of challenge workflows, where N and M are integers, such that N<M. The total set M of challenge workflows can be determined based on various factors and can be specifically tailored for a particular user device. The subset N of selected challenge workflows can be selected based on information included in the request or can be selected by default.

At block 1715, the authentication server can facilitate N challenges presented to the user according to the selected N challenge workflows. For example, if two challenge workflows are selected, then the authentication system can facilitate two challenges to be presented to the user. At block 1720, the authentication system can receive N responses from the user to the N challenges presented to the user. For example, one challenge may be to enter a code received at the user device via text message. A response received from the user can include the code entered by the user operating the user device.

At block 1725, the authentication system can authenticate the received N responses. In some cases, the authentication system can determine that the original request to access the data store is granted only when all N responses received from the user are correct. In other cases, the authentication system can determine that the request is granted when a certain threshold percentage of the N responses received from the user are correct. For example, the authentication system can determine or authenticate a response to a challenge by comparing information received from the user with information stored in the authentication system. The information received from the user can be caused to be sent by the user, and does not necessarily have to be knowingly or intentionally transmitted by the user. For example, when the user selects a link in an email received from the communication server, the device ID of the user device is automatically transmitted to the authentication server without further action from the user. If the N responses are not authenticated (e.g., when the user fails the challenges), the process can end here and the request can be denied. In some cases, the authentication system can provide additional challenges when the user fails the first subset of challenges in the authentication process.

At block 1730, the authentication system can grant the request. In some cases, once the user device is verified or authenticated, the user may not have to re-authorize his or her user device for subsequent requests to access the data store. In other cases, for example, the user may have to re-authorize his or her user devices periodically, randomly, or at each request to access the data store. When the request to access the data store is granted, the user may be directed to an application page or website that can facilitate the transfer or sale of the resources.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for scalable authentication of access to resource data using challenge workflows, the system comprising:
   a resource data store that stores resource data corresponding to a plurality of access rights to a resource, each of the plurality of access rights being indicative of access to the resource during a defined time period; and
   an authentication system, including one or more processor devices, that:
   receives a first communication from a user device, the first communication corresponding to a request for access to one or more access rights assigned to the user device, and the one or more access rights being included in the plurality of access rights stored in the resource data store;
   extracts a device identifier of the user device from the first communication, the device identifier characterizing an attribute of the user device;
   accesses a set of challenge workflows, each challenge workflow of the set of challenge workflows being a process that is executed to authenticate user devices requesting access to the resource data store;

generates a parameter for each challenge workflow of the set of challenge workflows, the generation of the parameter for each challenge workflow being based on the device identifier of the user device;
selects a subset of challenge workflows from the set of challenge workflows, the selection of the subset being performed using a comparison of each parameter and a threshold condition, wherein selecting the subset includes:
  determining, for each challenge workflow of the set of challenge workflows, whether the parameter associated with the challenge workflow satisfies the threshold condition, the threshold condition corresponding to a value, and
  for each parameter that satisfies the threshold condition, including the associated challenge workflow in the subset of challenge workflows;
executes each challenge workflow of the subset of challenge workflows, the execution of a challenge workflow from the subset including performing an authentication test to be satisfied before access to the one or more access rights is granted;
receives one or more second communications, each of the one or more second communications corresponding to a response to an authentication test associated with execution of a challenge workflow;
determines, for each challenge workflow of the subset of challenge workflows, whether the corresponding second communication satisfies the associated authentication test; and
establishes a communication link between the user device and the resource data store to grant access to the one or more access rights when the corresponding authentication test for each challenge workflow of the subset of challenge workflows is satisfied.

2. The system for scalable authentication of access to resource data using challenge workflows, as recited in claim 1, wherein executing each challenge workflow of the subset of challenge workflows further comprises:
transmitting a communication trigger that initiates transmission of a third communication to the user device using a communication channel, and the third communication including a selectable interactive element;
receiving a fourth communication including an additional device identifier identifying an electronic device on which the selectable interactive element was selected, the selection of the selectable interactive element causing the fourth communication to be transmitted;
comparing the device identifier and the additional device identifier; and
establishing the communication link between the user device and the resource data store to facilitate access to the one or more access rights when the device identifier corresponds to the additional device identifier.

3. The system for scalable authentication of access to resource data using challenge workflows, as recited in claim 1, wherein the request includes the device identifier, and wherein the device identifier includes data representing a type of computing device of the user device.

4. The system for scalable authentication of access to resource data using challenge workflows, as recited in claim 1, wherein when the device identifier identifies that the user device is a mobile computing device, the subset of challenge workflows selected is smaller than when the device identifier identifies that the user device is a server.

5. The system for scalable authentication of access to resource data using challenge workflows, as recited in claim 1, wherein establishing the communication link between the user device and the resource data store further comprises:
authorizing the user device to interact with the one or more access rights assigned to the user device and stored in the resource data store, wherein interacting with the one or more access rights includes initiating a request to reassign the one or more access rights to another user or initiating a printing operation corresponding to the one or more access rights.

6. The system for scalable authentication of access to resource data using challenge workflows, as recited in claim 1, wherein the authentication system further:
determines whether or not to initiate an authentication process, the determination of whether or not to initiate the authentication process being based on information included in the first communication, and the authentication process corresponding to execution of one or more challenge workflows, wherein:
when the determination is not to initiate the authentication process, the user device is granted access to the one or more access rights without execution of a challenge workflow, and
when the determination is to initiate the authentication process, each of the subset of challenge workflows are executed.

7. A computer-implemented method for scalable authentication of access to resource data using challenge workflows, comprising:
receiving a first communication from a user device, the first communication corresponding to a request for access to one or more access rights assigned to the user device, and the one or more access rights being included in a plurality of access rights stored in a resource data store;
extracting a device identifier of the user device from the first communication, the device identifier characterizing an attribute of the user device;
accessing a set of challenge workflows, each challenge workflow of the set of challenge workflows being a process that is performed to authenticate user devices requesting access to the resource data store;
generating a parameter for each challenge workflow of the set of challenge workflows, the generation of the parameter for each challenge workflow being based on the device identifier of the user device;
selecting a subset of challenge workflows from the set of challenge workflows, the selection of the subset being performed using a comparison of each parameter and a threshold condition, wherein selecting the subset includes:
  determining, for each challenge workflow of the set of challenge workflows, whether the parameter associated with the challenge workflow satisfies the threshold condition, the threshold condition corresponding to a value, and
  for each parameter that satisfies the threshold condition, including the associated challenge workflow in the subset of challenge workflows;
executing each challenge workflow of the subset of challenge workflows, the execution of a challenge workflow from the subset including performing an authentication test to be satisfied before access to the one or more access rights is granted;
receiving one or more second communications, each of the one or more second communications corresponding to a response to an authentication test associated with execution of a challenge workflow;

determining, for each challenge workflow of the subset of challenge workflows, whether the corresponding second communication satisfies the associated authentication test; and establishing a communication link between the user device and the resource data store to grant access to the one or more access rights when the corresponding authentication test for each challenge workflow of the subset of challenge workflows is satisfied.

8. The computer-implemented method for scalable authentication of access to resource data using challenge workflows, as recited in claim 7, wherein executing each challenge workflow of the subset of challenge workflows further comprises:

transmitting a communication trigger that initiates transmission of a third communication to the user device using a communication channel, and the third communication including a selectable interactive element;

receiving a fourth communication including an additional device identifier identifying an electronic device on which the selectable interactive element was selected, the selection of the selectable interactive element causing the fourth communication to be transmitted;

comparing the device identifier and the additional device identifier; and establishing the communication link between the user device and the resource data store to facilitate access to the one or more access rights when the device identifier corresponds to the additional device identifier.

9. The computer-implemented method for scalable authentication of access to resource data using challenge workflows, as recited in claim 7, wherein the request includes the device identifier, and wherein the device identifier includes data representing a type of computing device of the user device.

10. The computer-implemented method for scalable authentication of access to resource data using challenge workflows, as recited in claim 7, wherein when the device identifier identifies that the user device is a mobile computing device, the subset of challenge workflows selected is smaller than when the device identifier identifies that the user device is a server.

11. The computer-implemented method for scalable authentication of access to resource data using challenge workflows, as recited in claim 7, wherein establishing the communication link between the user device and the resource data store further comprises:

authorizing the user device to interact with the one or more access rights assigned to the user device and stored in the resource data store, wherein interacting with the one or more access rights includes initiating a request to reassign the one or more access rights to another user or initiating a printing operation corresponding to the one or more access rights.

12. The computer-implemented method for scalable authentication of access to resource data using challenge workflows, as recited in claim 7, further comprising:

determining whether or not to initiate an authentication process, the determination of whether or not to initiate the authentication process being based on information included in the first communication, and the authentication process corresponding to execution of one or more challenge workflows, wherein:

when the determination is not to initiate the authentication process, the user device is granted access to the one or more access rights without execution of a challenge workflow, and when the determination is to initiate the authentication process, each of the subset of challenge workflows are executed.

13. A computer-program product stored in a non-transitory machine-readable storage medium, including instructions configured to cause a data processing apparatus to perform operations including:

receiving a first communication from a user device, the first communication corresponding to a request for access to one or more access rights assigned to the user device, and the one or more access rights being included in a plurality of access rights stored in a resource data store;

extracting a device identifier of the user device from the first communication, the device identifier characterizing an attribute of the user device;

accessing a set of challenge workflows, each challenge workflow of the set of challenge workflows being a process that is performed to authenticate user devices requesting access to the resource data store;

generating a parameter for each challenge workflow of the set of challenge workflows, the generation of the parameter for each challenge workflow being based on the device identifier of the user device;

selecting a subset of challenge workflows from the set of challenge workflows, the selection of the subset being performed using a comparison of each parameter and a threshold condition, wherein selecting the subset includes:

determining, for each challenge workflow of the set of challenge workflows, whether the parameter associated with the challenge workflow satisfies the threshold condition, the threshold condition corresponding to a value, and for each parameter that satisfies the threshold condition, including the associated challenge workflow in the subset of challenge workflows;

executing each challenge workflow of the subset of challenge workflows, the execution of a challenge workflow from the subset including performing an authentication test to be satisfied before access to the one or more access rights is granted;

receiving one or more second communications, each of the one or more second communications corresponding to a response to an authentication test associated with execution of a challenge workflow;

determining, for each challenge workflow of the subset of challenge workflows, whether the corresponding second communication satisfies the associated authentication test; and establishing a communication link between the user device and the resource data store to grant access to the one or more access rights when the corresponding authentication test for each challenge workflow of the subset of challenge workflows is satisfied.

14. The computer-program product, as recited in claim 13, wherein executing each challenge workflow of the subset of challenge workflows further comprises:

transmitting a communication trigger that initiates transmission of a third communication to the user device using a communication channel, and the third communication including a selectable interactive element;

receiving a fourth communication including an additional device identifier identifying an electronic device on which the selectable interactive element was selected, the selection of the selectable interactive element causing the fourth communication to be transmitted;

comparing the device identifier and the additional device identifier; and establishing the communication link between the user device and the resource data store to facilitate access to the one or more access rights when the device identifier corresponds to the additional device identifier.

15. The computer-program product, as recited in claim 13, wherein the request includes the device identifier, and wherein the device identifier includes data representing a type of computing device of the user device.

16. The computer-program product, as recited in claim 13, wherein when the device identifier identifies that the user device is a mobile computing device, the subset of challenge workflows selected is smaller than when the device identifier identifies that the user device is a server.

17. The computer-program product, as recited in claim 13, wherein establishing the communication link between the user device and the resource data store further comprises:

authorizing the user device to interact with the one or more access rights assigned to the user device and stored in the resource data store, wherein interacting with the one or more access rights includes initiating a request to reassign the one or more access rights to another user or initiating a printing operation corresponding to the one or more access rights.

* * * * *